(12) United States Patent
Van Der Spoel

(10) Patent No.: US 12,541,781 B2
(45) Date of Patent: Feb. 3, 2026

(54) COOKIELESS ECOMMERCE PLATFORM

(71) Applicant: Gert Van Der Spoel, Veria (GR)

(72) Inventor: Gert Van Der Spoel, Veria (GR)

( * ) Notice: Subject to any disclaimer, the term of this patent is extended or adjusted under 35 U.S.C. 154(b) by 0 days.

(21) Appl. No.: 18/406,379

(22) Filed: Jan. 8, 2024

(65) Prior Publication Data
US 2024/0232966 A1     Jul. 11, 2024

Related U.S. Application Data

(62) Division of application No. 17/536,013, filed on Nov. 27, 2021, now abandoned.

(51) Int. Cl.
*G06Q 30/06* (2023.01)
*G06Q 30/00* (2023.01)
*G06Q 30/0207* (2023.01)
*G06Q 30/0601* (2023.01)

(52) U.S. Cl.
CPC ......... *G06Q 30/0609* (2013.01); *G06Q 30/00* (2013.01); *G06Q 30/0222* (2013.01); *G06Q 30/0633* (2013.01)

(58) Field of Classification Search
CPC ............... G06Q 30/0609; G06Q 30/00; G06Q 30/0222; G06Q 30/0633
See application file for complete search history.

(56) References Cited

U.S. PATENT DOCUMENTS

| | | | | |
|---|---|---|---|---|
| 2003/0233278 A1* | 12/2003 | Marshall | ............ | G06Q 30/0211 705/14.35 |
| 2008/0306835 A1* | 12/2008 | Agura | ................ | G06Q 30/0603 705/40 |
| 2009/0254511 A1* | 10/2009 | Yeap | ..................... | G06Q 50/265 715/764 |
| 2010/0179884 A1* | 7/2010 | Glaser | ................ | G06Q 30/0601 705/26.1 |
| 2010/0274647 A1* | 10/2010 | Earle | .................. | G06Q 30/0236 705/14.27 |
| 2011/0047023 A1* | 2/2011 | Lieblang | ............ | G06Q 30/0224 705/14.1 |
| 2011/0125561 A1* | 5/2011 | Marcus | .............. | G06Q 30/0213 705/14.15 |

* cited by examiner

*Primary Examiner* — Scott C Anderson
(74) *Attorney, Agent, or Firm* — DP IP GROUP; Franco S. De Liguori

(57) ABSTRACT

The present disclosure is directed to an improved cookieless ecommerce platform. The proposed approach involves receiving a confirmation of an order for the purchase of an item initiated by a platform member to a platform partner. The order includes at least one of an assigned e-mail address and a social community user id. The platform scans communications to/from the platform member to the partner to determine when a communication involves a request for an order, and based on the scanning, determines when a member is entitled to a cashback or similar reward.

20 Claims, 16 Drawing Sheets

COOKIELESS ECOMMERCE PLATFORM

CROSS-REFERENCE TO RELATED APPLICATIONS

This application is a divisional application of U.S. application Ser. No. 17/536,013, filed Nov. 27, 2021, which is a continuation of U.S. application Ser. No. 16/549,230, filed Aug. 23, 2019, which is a continuation of U.S. application Ser. No. 14/235,859, filed Mar. 31, 2014, now U.S. Pat. No. 10,395,289, issued Aug. 27, 2019, which is a 371 of International Application No. PCT/EP2012/065085, and which claims the benefit U.S. Provisional Application No. 61/513,855, filed Aug. 1, 2011 and U.S. Provisional Application No. 61/537,683, filed Sep. 22, 2011, the contents of which are incorporated herein by reference in their entirety.

BACKGROUND

Field

This invention relates generally to ecommerce platforms and solutions.

Background

Ecommerce is the business conducted over the internet using any of the applications that rely on internet. E-mail, Web Services, and Online Shopping all fall under ecommerce.

Privacy is one of the most complex issues faced by ecommerce ventures today. Most sites actively collect user information from users regarding their personal information. End users are supposed to fill out certain forms which require information private to them.

Many online purchasers are concerned about the disclosure of personal information, such as personal ID information, credit card information, full name, date of birth and the like to vendors (merchants) or intermediaries who sell or promote goods and services of third parties directly through their own websites, or indirectly through the websites of others.

Purchasers fear that their information might be shared with or used unethically or illegally by other organizations and/or companies, and that they may be spammed with unnecessary marketing or promotional material.

Purchasers are also afraid that the personal information provided to the seller is being intercepted and at risk.

There is also the fear that past visited browsing activities can be tracked by the newly visited (linked to) site, by the latter's access to cookie type information. One concern with being tracked is that the price quoted by a merchant may be different (higher) than that quoted to visitors to the site whose cookie profile shows them to have, for example, visited other shopping sites.

On the merchant side, the fact that a potential customer fears sharing information online with merchants also works against the merchants. Merchants are equally harmed when customers refuse do give financial information, or do so only after talking with a live person at the merchant's end. A live person increases a business' transactional costs which must then be built into its price (bad for consumer) or absorbed by the merchant (bad for merchant).

In short, ecommerce privacy concerns pose problems for both customers and vendors alike. Studies have shown that customers prefer to do business with a site operated by a trusted company or organization, as they feel more secure that their information is both not shared inappropriately or at risk of being misused.

A very legitimate concern is the common policy of ecommerce sites to distribute/sell their customer lists to third parties who in turn generate unwanted targeted e-mails to those customers.

Cookies:

As mentioned above, cookies and cookie tracking is a widely common ecommerce practice. Cookies are important as they allow vendors to recognize return customers and allow financial and non-financial information to be provided by the customer in a more expedient manner, often translating into an improved online purchase experience.

Cookies are also critical to certain affiliate marketing schemes as they provide a means for affiliates to ensure a commission is earned even after a purchaser clicks though the affiliate banner or only to exit the affiliate's site and return later to purchase direct from the merchant site.

In addition, cookies make it possible for any ecommerce website that requires personalized customer information to not have to require the customer to retype this information every time. Unfortunately, if a vendor can access a computer hard drive to retrieve a stored profile so can a hacker.

In short, a cookie is a message given to web browser by a web server. The browser stores the cookie in a text file. The cookie is then sent back to the server each time the browser requests a page from the server. The main purpose of a cookie is to identify users and possibly prepare customized web pages for them.

A cookie can be transient (used just for the lifetime of the browser session) or persistent. A persistent cookie is stored to permanent storage so that it is available the next time the user starts a web browser.

Because of privacy concerns expressed by many citizens around the globe, more and more privacy laws are being adopted with an aim at protecting internet users from rogue sites and hackers by severely restricting the ease by which cookies and cookie tracking were being employed in past. For vendors doing business globally, this may mean having a strict cookie use policy. For the customer, it may mean a diminished online purchase experience.

A cookie is used basically in two ways: tracking users and authenticating users. Advertisers such as Amazon use cookies to track users as well as to (i) deliver targeted advertising, and (ii) to track users' movements between websites because the first banner-ad presented to users can set a cookie containing a unique identifier.

As potential customers browse through ads and other banners which create cookies, an advertiser is able to construct a profile about users from the stored cookies.

Cookies can also authenticate users for multi-step web transactions. For example, WSJ.com sets a cookie to identify users after login. This allows user to download content from WSJ.com without having to re-enter a password.

Ecommerce sites also use cookies to associate users with a shopping cart. In all cases, a valid cookie will grant access to data about users. Unlike tracking cookies, it is very important that authentication cookies be protected from exposure and forgery.

Unfortunately, cookies were not designed with such protections in mind, and there is no standard mechanism to establish the integrity of a cookie returned by a browser.

Most sites do not use cryptography to prevent forgery of cookie-based authenticators. The unsafe practice of storing usernames or ID numbers in cookies illustrates this. In such a scheme, anyone can impersonate a user by substituting the victim's username or ID number in the cookie. Even schemes that do use cryptography often crumble under weak cryptanalytic attacks.

To protect against the exposure of personal data online, the recommended defense is for customers simply not to shop online, or to not register with online services that use unsafe cookie-based authentication. This is of course not realistic.

Recommender Systems:

In addition to use of cookies, ecommerce sites commonly employ recommender systems. Recommender systems are used by ecommerce sites to suggest products to their customers. The products can be recommended based on the top overall sellers on a site, based on the demographics of the customer, or based on an analysis of the past buying behavior of the customer as a prediction for future buying behavior. Broadly, these techniques are part of personalization on a site, because they help the site adapt itself to each customer.

Recommender systems enhance ecommerce sales in the following three ways:

Browsers into buyers: Visitors to a Website often look over the site without ever purchasing anything. Recommender systems can help customers find products they wish to purchase.

Cross-sell: Recommender systems improve cross-sell by suggesting additional products for the customer to purchase. If the recommendations are good, the average order size should increase. For instance, a site might recommend additional products in the checkout process, based on those products already in the shopping cart.

Loyalty: In a world where a site's competitors are only a click or two away, gaining customer-loyalty is an essential business strategy.

Accordingly, recommender systems provide benefits to both merchants and customers. Unfortunately, recommender systems make possible for merchants to discriminate against customers based on, for example, a predicted price sensitivity of purchaser. For instance, one customer might be willing to purchase the product at a price that would earn the site ten cents of profit, while another customer might purchase the same product at a one dollar profit. Purchasers' legitimate concern over possible discrimination works against those merchants who are not discriminating.

There is a need for cookie-free ecommerce solutions that provide a positive, customer-convenient experience.

In addition, there is a need for a more secure online purchasing transaction model which addresses concerns with regard to cookies generally, as well as the unauthorized and impermissible use of profile information which one may be asked to share with an untrusted vendor or service provider.

Furthermore, there is a need for an ecommerce platform that overcomes the business, ethical and legal problems of conventional ecommerce solutions. At the same time, this ecommerce platform must be flexible enough to allow purchasers to be able to receive trusted promotions and enjoy incentives and awards for conducting business online.

SUMMARY

It is therefore an object of the invention to provide an improved ecommerce platform that brings together buyers and sellers, where the former are incentivized to join and make purchases.

It is a further object of the invention for the platform to be able to manage transactions without the use of cookies.

It is also an object for the platform to manage, through the assignment/administration of dedicated e-mail addresses and/or user id's, member accounts in a way that maximizes any cashback incentive.

Furthermore, it is an object of the invention for buyers to be able to participate in a managed platform that does not treat similarly-situated buyers differently.

The proposed approach involves receiving a confirmation of an order for the purchase of an item initiated by a platform member to a platform partner. The order includes at least one of an assigned e-mail address and a social community user id. The platform scans communications to/from the platform member to the partner to determine when a communication involves a request for an order, and based on the scanning, determines when a member is entitled to a cashback or similar type reward.

BRIEF DESCRIPTION OF THE DRAWINGS

FIG. 5 is a representative user interface for initiating purchase requests directly from a Wyngle Partner.

FIGS. 6 and 7 illustrate a user interface of the Order Processing Section.

DETAILED DESCRIPTION

Figure 1:
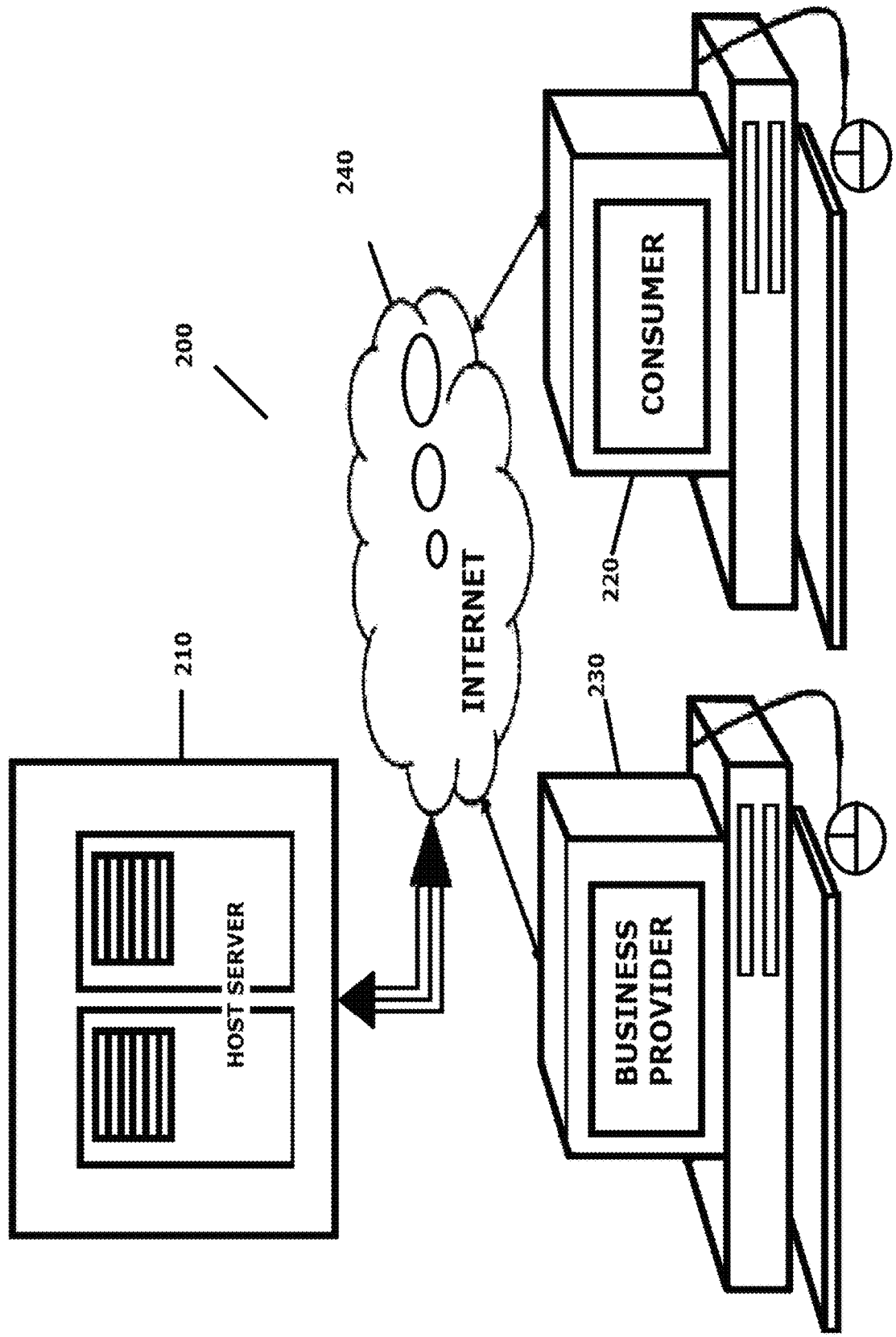
FIG. 1 illustrates one embodiment of a system for carrying out the invention.

The word "exemplary" is used herein to mean "serving as an example, instance, or illustration." Any embodiment described herein as "exemplary" is not necessarily to be construed as preferred or advantageous over other embodiments.

The present invention is directed to a system and method for an online shopper ("the platform member") to initiate and complete a purchase from a business ("the platform partner") the transaction for which is facilitated by a web-based ecommerce solution ("the platform").

The primary advantage of the platform is a unique mechanism disclosed herein for platform members to close on a purchase transaction and, at the same time, receive a cashback incentive or similar reward.

Before proceeding to a detailed description of the figures, the following preliminary connotational matters will be addressed.

The term "host server" designates the server on which a host website (i.e., all or part of the platform) will be maintained. A host website comprises one or more web pages, including, but not limited to: a home page, a contests page, a photo gallery page, a contact page, a consumer account page, a merchant page, blog pages, chat rooms, consumer rating pages, and so forth.

The terms "platform", "manager", "managing entity", "host," "host server," and "host website" will be used interchangeably since in one embodiment, the host server is accessed through the Internet or World Wide Web, as a website. However, a "portal" will be used to refer to a web page or merchant access point on the host website. The present system and method allow for a merchant to be given, purchase or license a portal on the host website for its use.

Additionally, while it is recognized that there is a technological distinction between Internet and World Wide Web, the terms are seemingly interchangeable and used as such throughout this description. The use of these terms in this fashion is for descriptive convenience only. The skilled artisan will appreciate that the system encompasses the technological context of both the Internet and the World Wide Web.

Further, reference to "data" or "data storage" will refer to information stored on the "host server" and transmitted, in one embodiment, from a consumer, via the Internet from the consumer's personal computer or other personal electronic device capable of Internet communication. The transmission of data from the host server to the businesses is also envisioned to occur via Internet transmission or other secure electronic transmission from the host server to the business' computer server.

The terms "platform member", "buyer", "user," "searcher," "consumer," "recipient," "subscriber," and "customer" will be used interchangeably. Specifically, the terms "platform member", "consumer," "subscriber," "customer," and "recipient" are used alternately to designate any person, business, or any other entity that receives communications from any other entity, including all types of businesses and organizations.

Similarly, the terms "platform partner", "advertiser", "merchant", "vendor", "supplier", "brick and mortar business" or plain "business" will be used interchangeably and will be used herein to designate any entity sending communications that are the subject of the present system and method.

"Input data", "search request", "search query", or plain "search", as defined in the present includes, but is not limited to, any parameter defined by the host server and presented to platform members that can be used by the host server to identify available cashback incentives associated with one or more products or services.

The terms "cashback incentive" or "incentive", "business offer" or "offer", "incentive reward" or "reward" or "deal" is defined to include, but not be limited to, any incentive—but principally any point or reward scheme involving the receiving of a "cashback" amount—to a platform member for purchase of any product or service, download of any product or service, including online delivery of video, software or music via the Internet, pick-up or delivery of food, groceries, goods, services, other services provided in the home, such as lawn care, housecleaning, laundry services and pool services, and entertainment, such as live music, concerts, theatre, dance, comedy and so forth. Incentives also apply toward bookings of online hotel reservations, flights, car rentals and other similar hospitality and travel industry services.

In an exemplary embodiment set out below, a platform member may also operate as a platform partner and offer its own wares for sale on the platform. In such scenarios, an incentive may, in lieu of cashback, comprise discounted advertisements and other incentives. Incentives may also include gifts, offers for airline tickets, rental cars and hotels, and the like.

The novelty of the present application is focused on a cookieless ecommerce experience that utilizes a clever cashback incentive scheme to encourage participation.

It should be appreciated that input data and parameters can be automatically entered by the buyer from any electronic device, including portable devices, such as smartphones and the like, to communicate with the host server.

In addition, the presently disclosed platform is capable of receiving a location input data parameter from, for example, a portable device equipped with GPS. Location information may be used by the platform to determine an optimum incentive. An optimum incentive may account for the fact that a potential buyer within proximity of a point of sale is more likely (or less likely in some cases) to complete a transaction.

Presently disclosed embodiments for an improved ecommerce reward solution are radically different from conventional ecommerce solutions. The proposed solution uses a non-cookie approach to connect buyers and sellers, as a result of which the need for traditional affiliate marketing and advertising is eliminated or otherwise rendered obsolete, as the affiliate model traditionally requires cookies in order to allow the proper tracking of referring affiliate sites.

In accordance with present embodiments, buyers are provided with easier and direct access to a seller's website and without security risks from an unknown affiliate (virus, phishing, jpg's with embedded code, etc).

In addition, buyers are protected from scams and misleading routing of purchasers through affiliates who may cause the buyer to overpay for items not originating directly through a vendor site.

As will be described in greater detail below, the present solution achieves this by having a managing entity directly supervise cashback transactions associated with sales/purchases between platform members and partners in a cookieless manner.

A preferred embodiment of the present invention will be described hereinafter in connection with an ecommerce platform named Wyngle®, which was written by the present inventor. Wyngle, as the term is used herein, is intended only as a generic term to refer to the presently claimed and disclosed web-based platform and any associated tools, such as browser enabling tools and interfaces, described here below.

Wyngle members benefit from sharing in any commissions, cashbacks and other promotion money, points or credits received by the Wyngle platform, while vendors benefit from the increased exposure to a large database of Wyngle members.

Turning now to the figures, FIG. 1 illustrates one embodiment of a system 200 for carrying out the invention. System 200 includes one or more host servers 210 (collectively functioning as the Wyngle platform), one or more members 220 (collectively the Wyngle members), and one or more advertisers 230 (collectively the Wyngle partners). As shown in FIG. 1, each member 220 communicates directly with host server(s) 210 as well as directly with advertisers/partners 230 via the Internet 240.

As noted above, the host server 210 includes a host website with multiple (not shown) web pages displaying a number of interface screens. More specifically, the web pages are formatted and developed using Hyper Text Markup Language (HTML) code. As known in the art, an HTML web page includes both "content" and "markup"

portions. The content portion is information that describes a web page's text or other information for display or playback on a computer or other personal electronic device via a display screen, audio device, DVD device or other multimedia device. The markup portion is information that describes the web page's behavioral characteristics, including how the content is to be displayed (e.g., the frame set) and how other information can be accessed (e.g., hyperlinks). Thus the HTML code that marks up formatted web pages of the host website of one described embodiment displayed in selected, predetermined display regions of a single region of a single computer or other electronic device display screen. It is appreciated that other languages, such as SMGL ("Standard Generalized Markup Language"), XML ("Extensible Markup Language") DHMTL ("Dynamic Hyper Text Markup Language"), Java, Flash, Quick Time, or any other language for implementing web pages could be used.

The computer or device used by consumer 220 in communicating with the host server 210 (and/or advertiser/partner 230) are any type of computing device capable of accessing the host server 210 through a host website via the Internet 240, and capable of displaying the host server's 210 stored web pages using well-known web browser software packages, or any other web browser software. Such computing devices or other electronic devices include, but are not limited to, personal computers (PCs); hand-held computing devices (e.g., PDAs), cellular telephone devices and web-based telephone sets (e.g., "Web-TV"), collectively referred to herein as the consumer's computer or the computer. Practically and preferably, the computing device is a smart phone, tablet pc, or the like advanced or thin client device, of light weight and/or high functionality.

The host server 210 is any type of computer server capable of supporting a website and web-based management tool. The operating system used to run host server 210 and programming used in implementing the method of one embodiment are stored in un-illustrated memory resident with host server 210. The operating system and stored programming used in implementing the method of one embodiment can be any operating system or programming language.

The various hardware and software components of system 200 communicate, in one embodiment, via the Internet 240, to implement the method of the present invention. Although not depicted, Internet 240 access by consumer's 220 computer could be implemented via an Internet Service Provider (ISP), a direct dial-up modem connection, a digital subscriber link (DSL), a dedicated T-1 connection, a wireless local area network connection (WLAN), a cellular signal or satellite relay, or any other communication link.

Wyngle Platform/System

Wyngle is organized in four distinct sections, including: (1) Member Sign-up; (2) Order Creation; (3) Order Processing; and (4) Cashback Approval. Each of these distinct sections is described separately below and in connection with FIGS. 2 to 8.

(1) Member Sign-Up Section

Figure 2:
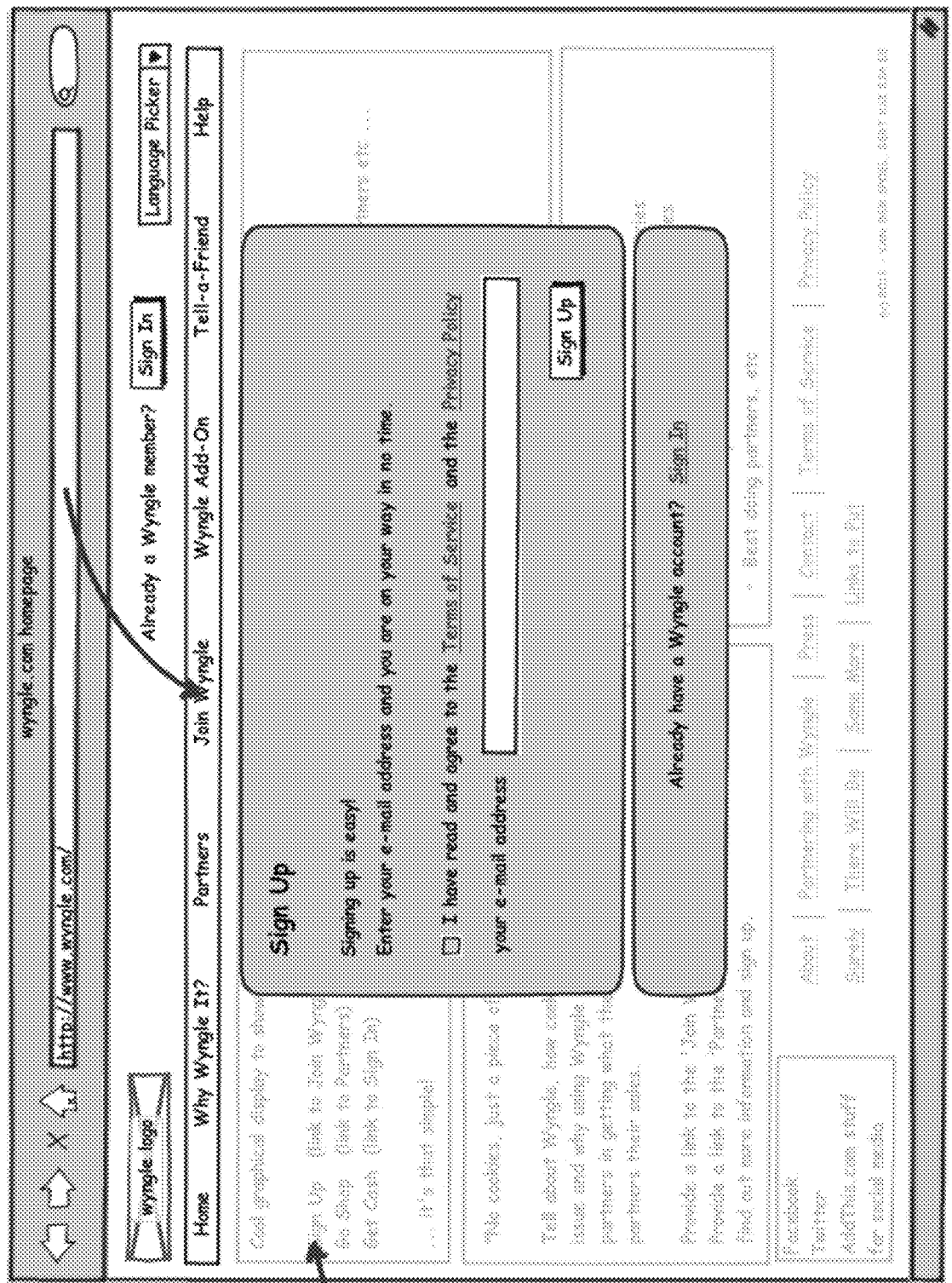
FIGS. 2-4 illustrate the user interface of the Member Sign-up Section.
Figure 3:
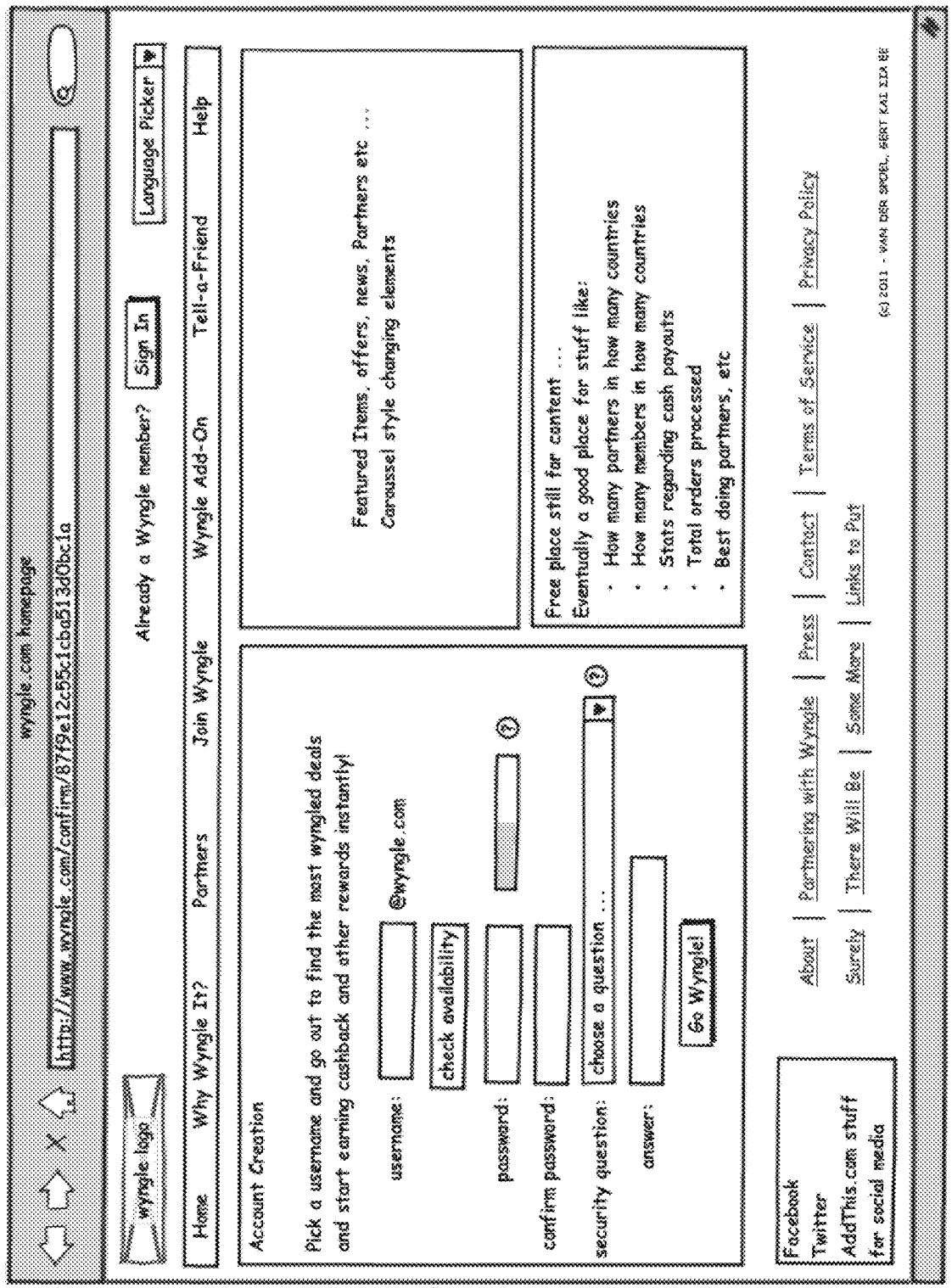
Figure 4:
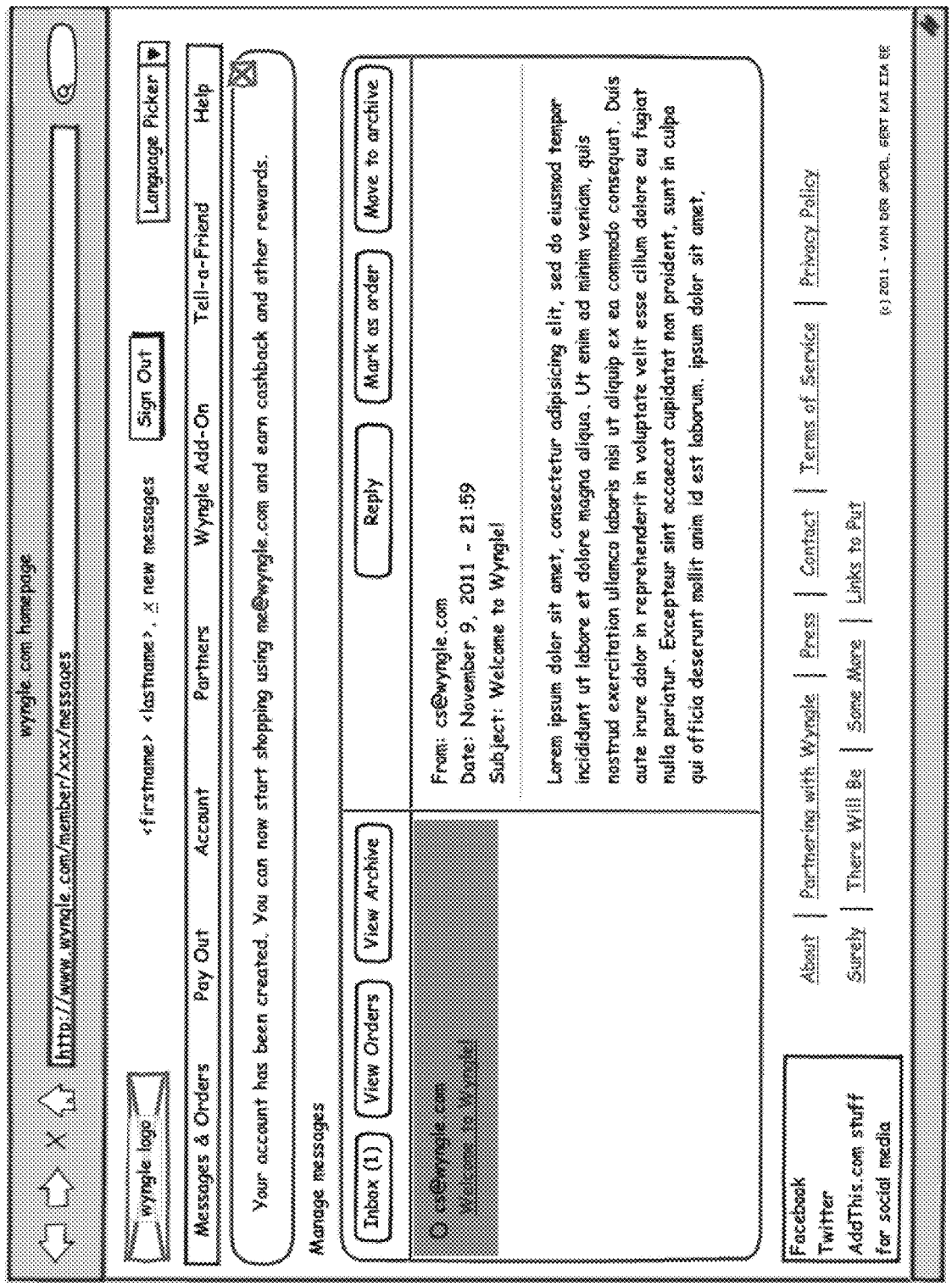

FIGS. 2-4 illustrate the user interface of the Member Sign-up Section. As shown in these figures, a member creates an account by going to the wyngle.com website, selecting the "Join Wyngle" widget, and from there the option for "sign up", which then guides the new member through the process of completing fields, including at a bare minimum, a username (e.g., "<username>", password and an already existing e-mail address (e.g., me@domain.com)

Having completed the process, the new member will have been assigned a new account with which will have been associated a new e-mail address account. In accordance with an exemplary embodiment, the e-mail address is in the form username@dwyngle com, where the "username" expression is used here to generically capture the selected Wyngle id of the new member (e.g., georgex@wyngle.com, mariah@wyngle.com, and the like). Once an account is open and active, customer service confirms this by an e-mail response from es@wingle.com. As can be appreciated, the Wyngle member account also serves as a web-based e-mail solution, from which members are able to send and receive e-mails.

Each member's personal and existing e-mail address upon the account creation is linked to the newly created Wyngle e-mail address.

For example:
Existing e-mail address: me@domain.com
E-mail address created by Wyngle: user@wynyle.com
The Wyngle system will correspond user@wyngle.com to me@domain.com (2) Order Creation Section Once an account is opened, the member is able to place purchase requests using the e-mail address created by Wyngle. Purchase requests can be made directly from Wyngle or by going to any affiliate/Partner site. In both purchase scenarios, a Wyngle Member must provide a @wyngle.com e-mail address in order to receive a cashback incentive.

Figure 5:
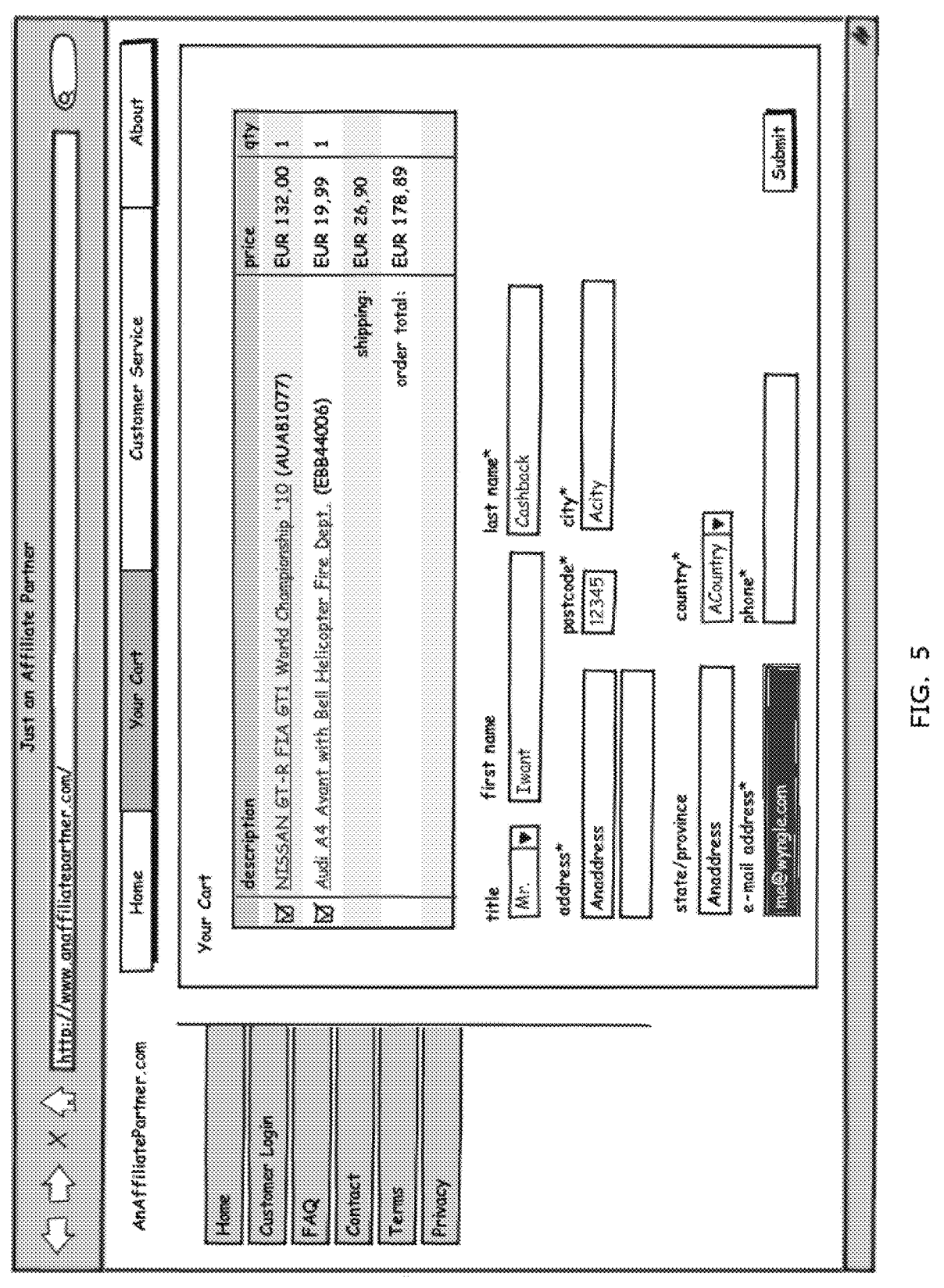

A representative user interface for initiating purchase requests directly from a Wyngle Partner is illustrated in FIG. 5. This user interface is part of the Order Creation Section. A Wyngle Member will typically get to this UI by visiting a Wyngle Partner site.

In an alternate embodiment, the Wyngle Partner site could be accessed by the Member logging on to the Wyngle System site and linking to a Partner site from there. A Member may wish to do this to compare Wyngle Partner promotions from one location, and availing itself to multiple available discounts and promotions from multiple Partners all in one area. It is contemplated that promotions could be arranged by shopping interests of customers (based on their profile generally), or by shopping categories of customers generally, or by best currently available promotions, or any other way that achieves the objective of encouraging shopping from Wyngle Partners in exchange for an opportunity for Wyngle Members to benefit from cashbacks for example.

Purchase requests will typically be initiated by a Member from a Partner site. This allows Partners to remain independent and continue to develop their brand image. To attract Wyngle Members to buy direct from Partner sites, Partners may turn to traditional media, internet promotional campaigns, and other traditional advertising channels. Once a Member goes to a Partner site, the Partner site will provide the Member with its own UI for Order Creation.

The UI could be the same or different from the UI in FIG. 5. The important thing is that the UI allow the Member (i) to be able to accurately upload/insert order details, and (ii) to provide a @wyngle.com e-mail address which will be used for communications regarding the order from there forward.

Without a proper @wyngle.com e-mail address for communication, the Wyngle System will have no direct way of confirming that an order was placed. Since cashbacks are only available to Members, Members must provide the Partner with their @wyngle.com e-mail address. Since all wyngle.com e-mails are scanned and processed by the Wyngle System, the Wyngle System is set up to intervene in the purchase transaction without the Partner having to make elaborate changes to its site or order creation process, other than to correspond with the Wyngle System using e-mail or other equivalent manner and only for the purpose of confirming the processing and eventual execution of purchase orders in order to properly administer cashback incentives.

In a further exemplary embodiment, a Partner site may optionally elect to have Members link directly to the Wyngle System to place the order. This is of great benefit to Members with fears and concerns in providing bank details and/or credit card information directly to third parties with whom they may have never purchased before.

Redirecting Members to the Wyngle Order Creation Process is of benefit to Partners since credit card transaction details, declined transaction, customer complaints or questions, and the like can be overseen, at this early stage, by the Wyngle System, freeing up resources by the Partner to invest people and resources elsewhere.

In a further alternate embodiment, wyngle.com maintains statistics on many operational aspects of the order creation process, including customer satisfaction indicia, problems with Partners/Members, declined credit card transactions, excessively high return habits of Members, and the like. This information may be used for various purposes, including (i) to positively or negatively adjust cashback awards that Members may otherwise be entitled to, (ii) to generate any number of different rating indicia for Members and/or Partners, and (iii) when necessary, as a basis to exclude Members or Partners from participation.

In yet a further embodiment, Wyngle Members are encouraged to use the wyngle.com e-mail address as the preferred e-mail address for communications involving purchase orders placed with Non-Partner sites. Technically, since Non-Partner sites are not in any contractual privity with Wyngle, Wyngle cannot intervene in the specific order. Since communications involving the wyngle.com e-mail address as between the Member and the Non-Partner will necessarily be intercepted by the Wyngle System, the System will recognize that it does not involve a transaction with an official contractual Partner of Wyngle and may optionally ignore the e-mails.

In an alternate scenario, non-partner order e-mails are actually not fully ignored. Once a Member places an order with a non-partner using a Wyngle e-mail address, the intercepted order confirmation e-mail from the non-partner will be processed as a 'message' rather than as an order, and dropped in the Member's message box.

The Member may wish to move this to the Order box to be able to track all purchase orders made online, including to both partners and non-partners. However, the order itself will continue to not be eligible for cashback or rewards.

The Wyngle system may extract basic order data (such as the 'from' addresses) from non-partner order confirmation e-mails. This is so in case another member places an order with the same company, the Wyngle system will directly recognize it as a non-partner order and process it accordingly.

In one scenario, statistics are maintained as to the number and/or types of transactions that have been intercepted involving Non-Partner sites, and this information then used in attempts to enlist the Non-Partner sites into the Wyngle Partner family.

As social networking sites are becoming more and more popular, so much so that many allow inter-site linking between them without customers having to use but one ID and one password to surf between them, there are two recent phenomena taking place that is changing the landscape of how people communicate.

For one, e-mail is no longer a principal or at least main method of communication. Social networking sites rely on chatting and posting as a way for community members to share and exchange ideas.

Secondly, with sites such as Facebook.com having reached worldwide mass adoption, many have seized on this access to a mass shopping audience and established their own marketplaces.

In accordance with an alternate embodiment, community members that belong to at least one social media site and therefore have at least one uniquely assigned ID to connect an make purchases, may continue to use this ID, much like the wyngle.com e-mail address identifier to initiate orders from social media sites. The social media sites, in turn, may use this ID in partnership with Wyngle to ensure that community Members that agree to also become Wyngle Members, are able to benefit from a cashback collaboration between, for example, facebook.com and wyngle.com to (i) provide Facebook members with valuable cashbacks and (ii) at the same time, drive many more community members of Facebook to the latter's marketplace. All communications involving orders on the social community marketplace are translated into communications that are scannable and processable by wyngle.com in substantially the normal manner as described further below as with non-social community type transactions. With time, it is envisioned that social community sites may individually or collectively cooperate so the Wyngle System processes are built into the community sites themselves. This way, instead of community Members having to provide a unique wyngle.com e-mail address identifier, they simply provide their unique Facebook or similar ID, which for many this is the only ID that will likely never change in their lifetime (unless e-mail addresses).

In the same way that e-mail addresses allow Wyngle (i) to track order transactions across many Partner merchants, (ii) in order to coordinate cashback processing, and (iii) to do so in a manner that effectively eliminates cookie concerns and issues, a Facebook like social community can capitalize on the unique user ID it has assigned its community members to achieve the same objectives.

(3) Order Processing Section

Figure 6:
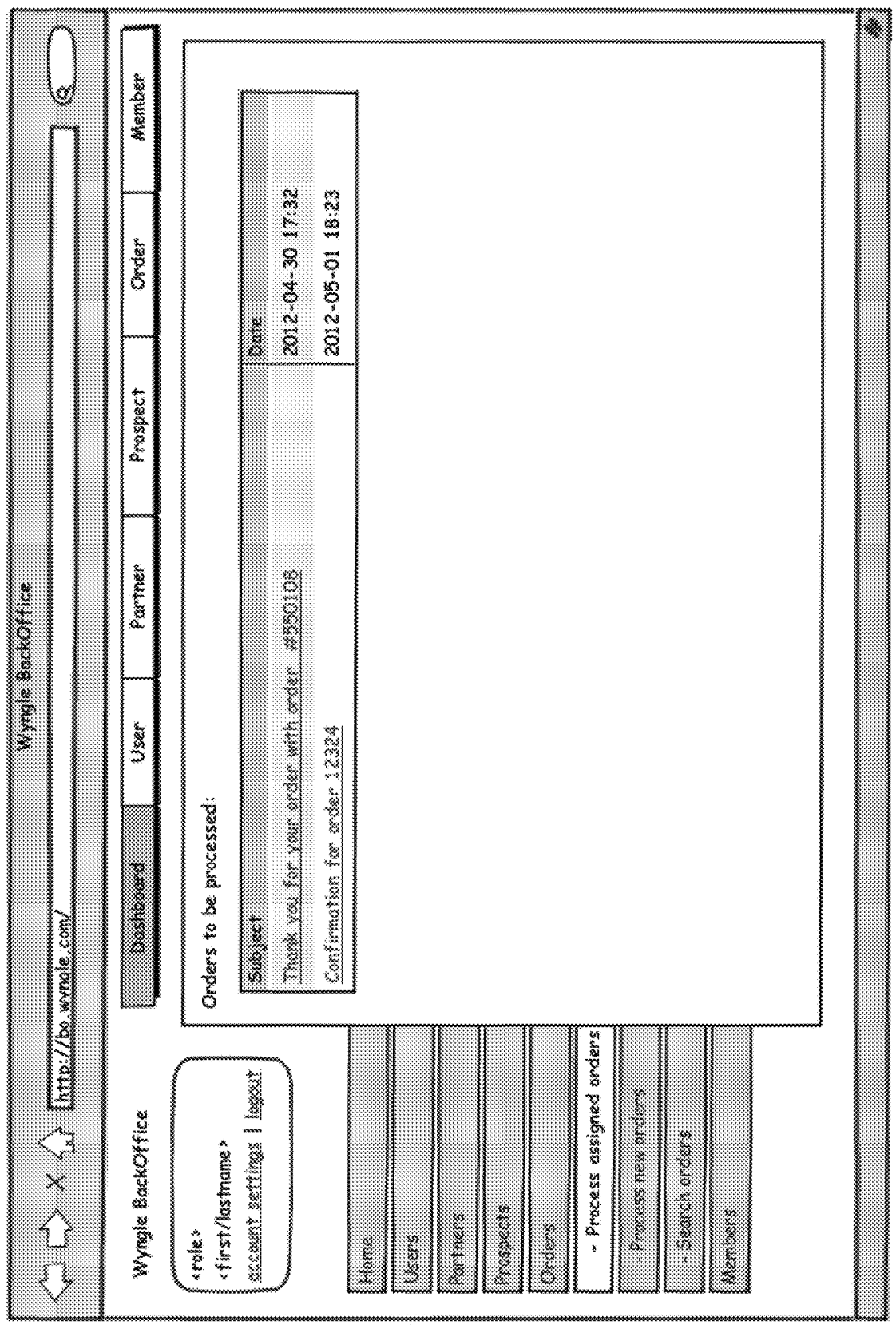
Figure 7:
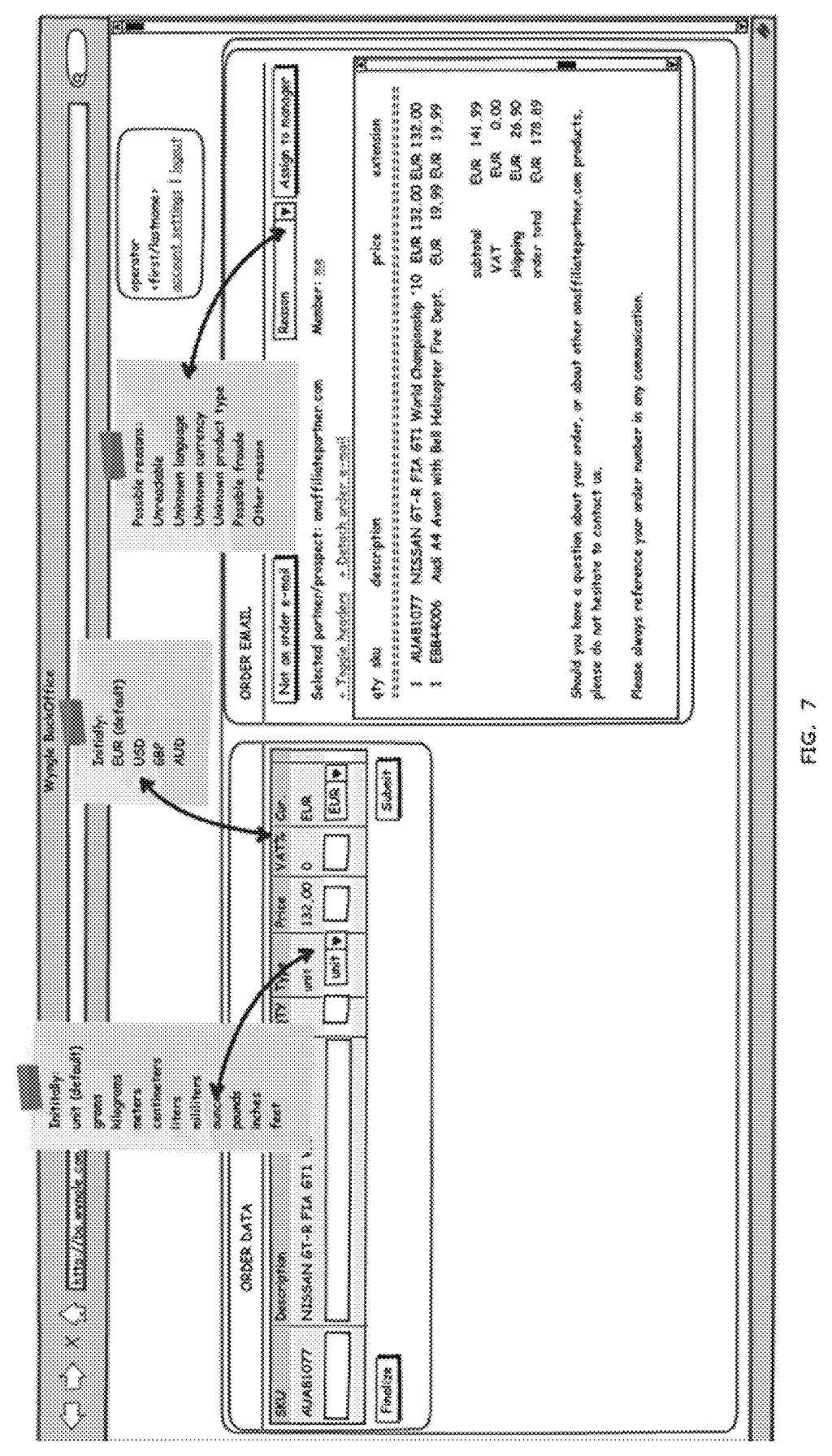

FIGS. 6 and 7 illustrate a user interface of the Order Processing Section. The Wyngle system receives the e-mail, passes it directly on to me@domain.com and at the same time processes it in order to calculate the cash back commission to be rewarded for this order. In case it is an order from a non-partner, the data will be stored as well and that non-partner could be considered to be approached in order to be secured as additional partner in the future.

(4) Cashback Approval Section

Figure 8:
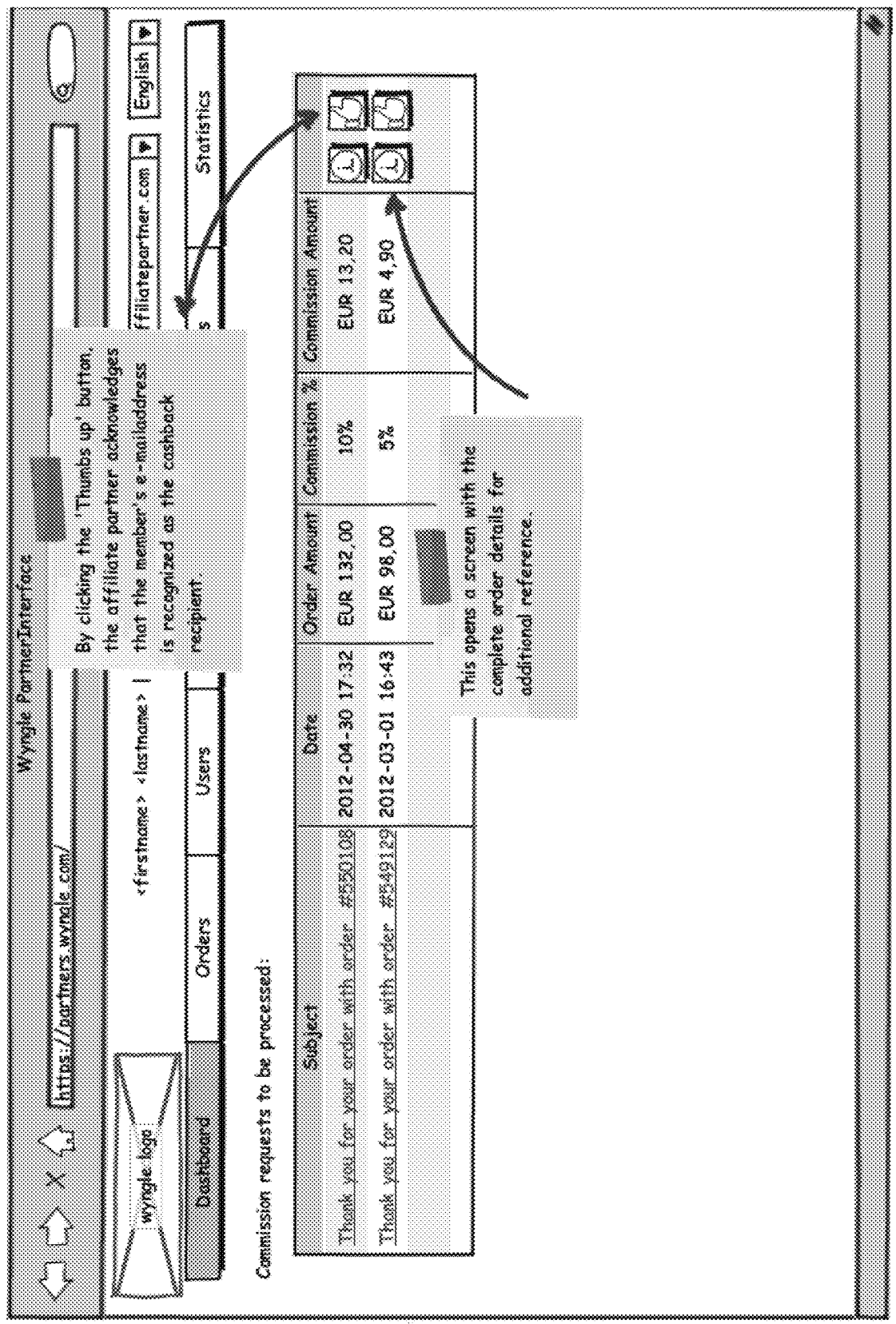
FIG. 8 shows a user interface for the Cashback Approval Section.

FIG. 8 shows a user interface of the Cashback Approval Section. Once a certain threshold of cashback has been generated by the member, the member has the option to have the money paid out via bank or PayPal.

The system offers, among other things, a user-friendly complete overview of orders made in the past, a record of cashback rewards that have been received, cashback balance and the possibility to provide additional (personal) details. In this way, Wyngle is able to offer targeted purchase suggestions and information about interesting partners.

Members are similarly able to track their cashback accounts from one place and for all different participating vendors. The platform also offers a powerful alternative to other schemes such as the use of coupon codes or discount type schemes by vendors.

Furthermore, Wyngle platform members/buyers do not have to log on to an affiliate to perform a transaction, nor are they subjected to annoying pop-ups asking them to enable cookies, or worry about privacy issues surrounding cookies. In this way, Wyngle solves the cookie problem in jurisdictions with a European cookie-type law requiring affiliates to obtain consent each time a cookie is deposited in a buyer's cookie file.

As for vendors, the platform provides quality and meaningful customer data to vendors. The Wyngle system, for example, forms a central and most updated repository of communication details of customers for the purpose of marketing or receiving other communication from vendors. The chance of customer e-mail (and other) records to be up to date is much greater, as the customer has to keep his records up to date in order (i) to receive communication from latest orders, (ii) to receive communications from the platform, and/or (iii) redeem previous cashbacks (or other similarly offered incentives, e.g. offline coupons, other offers).

Toward this end, vendors are ensured access to current and regularly updated e-mail contact information, but also relevant profile stats for more direct or targeted promotions to Wyngle members.

Wyngle aims to become the platform of choice by consumers for online shopping. Wyngle does not intend to compete with online sellers, but rather to help them to create a better, cookieless marketplace. It does this by acting as a liaison for coordinating cashback distributions from savings realized by the sellers in reducing costs in other ways. Rather than paying commissions to affiliates (even when click-throughs do not result in a sale) the extra savings is kicked back (via the Wyngle platform) to the actual purchaser in the form of a direct cashback award. While Wyngle gets a small commission as facilitator, its commission is negligible by comparison which allows vendors to offer bigger discounts to customers, resulting in a happier and more loyal customer base.

The fundamental premise is that customers benefit from cashbacks issued for transactions between customers and partners so long as the transactions involve use of a Wyngle e-mail address at the time of order.

The idea is that buy-sell soft costs, such as advertising and affiliate marketing expenses, are significantly reduced or eliminated by the Wyngle model. Because partner vendors have an alternate more efficient way to target customers directly—using the Wyngle e-mail address as the tracking vehicle—the extra savings can be returned (passed back to the consumer).

In an alternate embodiment, Wyngle also acts as an advertising source for vendor partners, by pushing information to Wyngle members directly through different channels of advertising available to it.

In one scenario, Wyngle members are given a browser plug-in (or similar add-on application). The plug-in functions to generate targeted promotions towards members in order to incentivize purchases from those Wyngle partners currently offering generous cashbacks or similar incentive awards. These targeted promotions can appear automatically while surfing the web using intelligent context-relevant algorithms and models.

In another scenario, search engine results are enhanced in a manner that visually communicates targeted special promotions on a product or service directly related to the search query and/or the retrieved search results.

Figure 9:
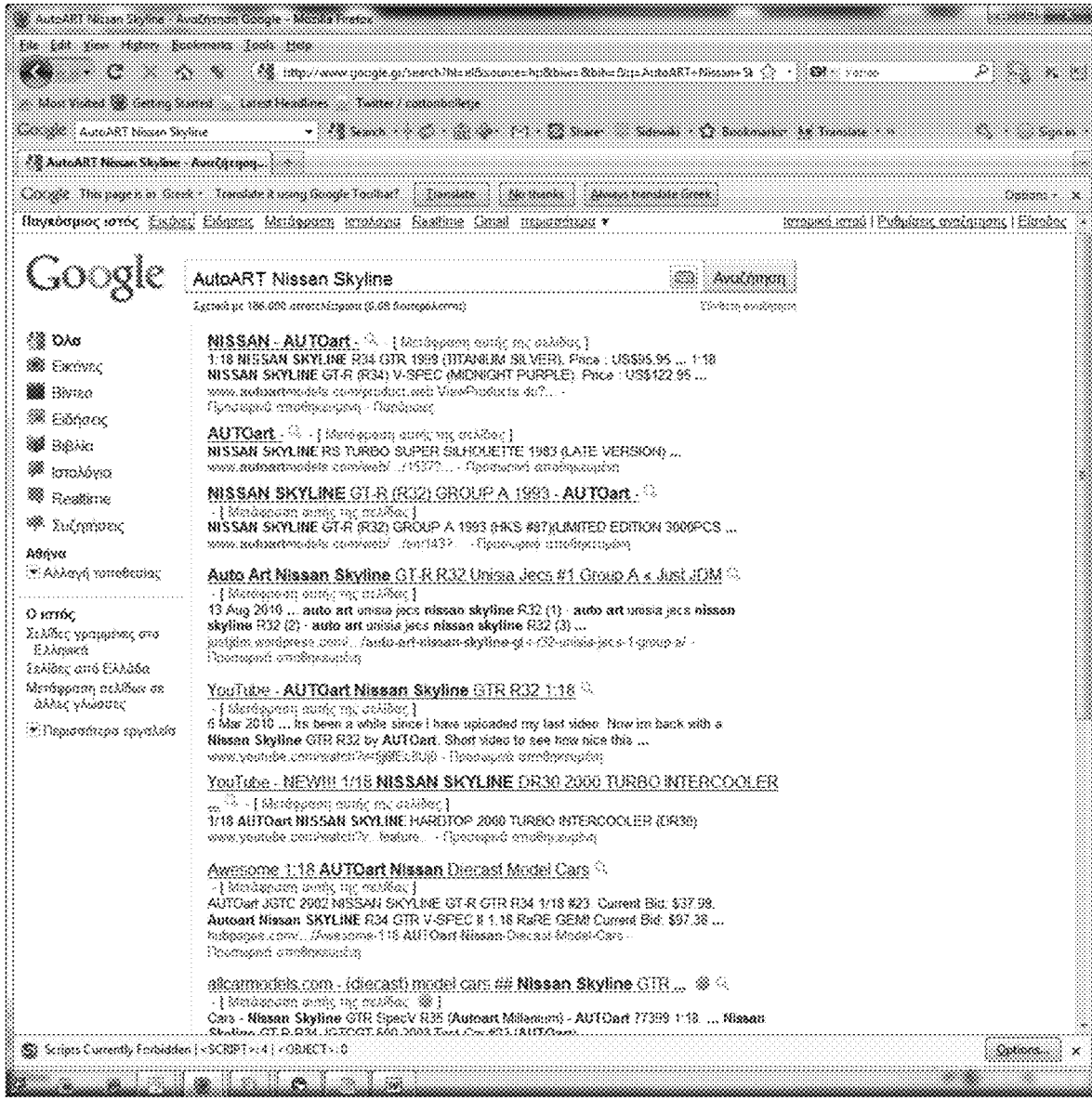
FIG. 9 shows an exemplary search results page with Wyngle gold coins employed to direct attention to the existence of a Wyngle partner relationship.

FIG. 9 shows an exemplary search results page with Wyngle gold coins employed to direct attention to the existence of a Wyngle partner relationship. The gold coin may act as information only, or as a pop-up for additional information, or as a special clickthrough for Wyngle members, where each may in turn access one's account and learn more about current incentives being offered. Alternatively, clicking on the link of the partner and completing a purchase order results in a cashback reward for the shopper and a commission for Wyngle—assuming of course, the Wyngle Member provided its @wyngle.com e-mail address for communications involving the order, and not another e-mail address (at least not exclusively).

By registering total click throughs, Wyngle is able to provide its partners with accurate conversion numbers in terms of clicks versus actual sales statistics.

In yet a third scenario, Wyngle partner promotions are provided as part of a listing (or set of catalogued listings) of current cashback offerings advertised on a Wyngle host server. These listings may be made available directly from Wyngle site.

In addition to the cookieless advantages explained above, Wyngle helps improve the overall online shopping experience for customers, while helping vendors come up with new and more efficiently targeted advertising campaigns.

Since e-mail transactions are scanned by Wyngle as part of each purchase transaction, Wyngle is able to track customer purchases and—assuming vendor is a Wyngle partner—process and apply the appropriate cashback reward to those transactions.

It is contemplated that in those cases where vendor is not a partner, a log is kept of buy-sell transactions and this information used to solicit the non-partner to become a partner in the future.

The Wyngle approach of having online consumers use a dedicated e-mail address to initiate and place online orders addresses a key concern with vendors, but also with customers. This key concern is the high frequency in which many customers change their e-mail accounts. Often change in e-mail addresses result from a change in work address, change in ISP provider, or any number of other reasons. To extent however that e-mail is often the only practical and typical way for vendors and customers to stay in touch, from vendor standpoint this often means lost business opportunity. For customers, this means having to again provide the vendor with previously provided personal (and especially) financial information.

In an exemplary embodiment, personal member information is kept and maintained by Wyngle, which in turn may be provided to partners with whom Wyngle does business. This not only ensures an increased level of security since personal information from customer to vendor is provided only to Wyngle partners from Wyngle, it also ensures that member info is more likely to be updated and accurate.

Incidental Benefits

By aggregating vendor and customer private data, Wyngle works to provide quantity (volume) of customer data. Once Wyngle has reached a critical mass of customers and vendors, this can be used to strengthen customer and vendor satisfaction and traction, improve cashback incentive schemes, enhance respect of privacy, and create image for trustworthiness and professionalism.

With higher buying incentives, Wyngle is able to improve return customer activity. Wyngle's one stop shop approach is also many times more likely to alert customers and their financial institutions as to possible fraudulent activity on one or more accounts.

Wyngle Advantage to Vendor Compared to Traditional Models

Wyngle provides an opportunity for vendors to help improve customer complaints associated with affiliates who spam/abuse e-mail of customer mailboxes. Affiliate marketing accounts for a large percentage of spam—worthless web pages offering only links. Putting affiliate marketing links on blogs creates pings and fake trackbacks, and many bloggers have had to close down the comments sections of their blogs because there is so much affiliate blog spam.

Wyngle helps (i) bring an end to low quality affiliate links/pages, (ii) addresses issues involving misuse and fraud with regard to voucher codes; and (iii) reduces the amount of time and resources expanded in sustaining affiliate technical/administrative support for links. The latter is particularly a key concern with link updating. Affiliate links must be routinely updated to ensure up-to-date and accurate indicia such as link price, product availability, and product description type information. Some affiliate link changes are more involved and may require significant changes to the links, as might be the case with website landing page and restructuring configuration parameters.

Fraud with prices, credit cards, pay-per-clicks, cookies stuffing/cookie dropping/other methods give rise to all sorts of unethical and illegal issues, as well as e-mail spamming, false advertising, adware, forced clicks, phishing, use of jpg's including code, and other concerns. Also, fraudulent credit card transactions, chargebacks, administration fees, and $3^{rd}$ party agency support resources for these activities are also a cost on businesses which gets passed on to the customer in the form of higher point of sale costs. By reducing these costs, the Wyngle model ultimately helps brings down costs overall, which benefit customers directly.

From Wyngle perspective, focus is on an improved buyer experience. Affiliate sites, by contrast, are mainly focused on clickthrough commissions and profit from those activities. Affiliates, and affiliate like schemes such as Google AdWords and Google AdSense, focus mainly on the links. With Wyngle, revenue is built by creating a relationship with the buyer (not a link). The Wyngle focus is on the buyer, and more specifically, on the buyer profile. This buyer profile captures preferences (e.g., shopping and product preferences) and personal data (age, sex, location, etc) type information, which are used by the Wyngle platform to select/match incentives with customer needs.

While it is possible to extract and even profit from all sorts of information regarding Wyngle buyer activities, commercial viability and success depends very much in creating and maintaining buyer trust. Buyer trust comes by ensuring that buyer activities remain personal and private. Consistent with the general theme of having a cookieless online shopping experience, Wyngle is envisioned as being configured so as to reduce and/or otherwise completely eliminate junk e-mail and otherwise non-useful solicitation and marketing materials.

The functional characteristics and operational flow of the Wyngle approach will now be described in connection with reference to the flowchart in FIGS. 10A-10C.

Figure 10A:
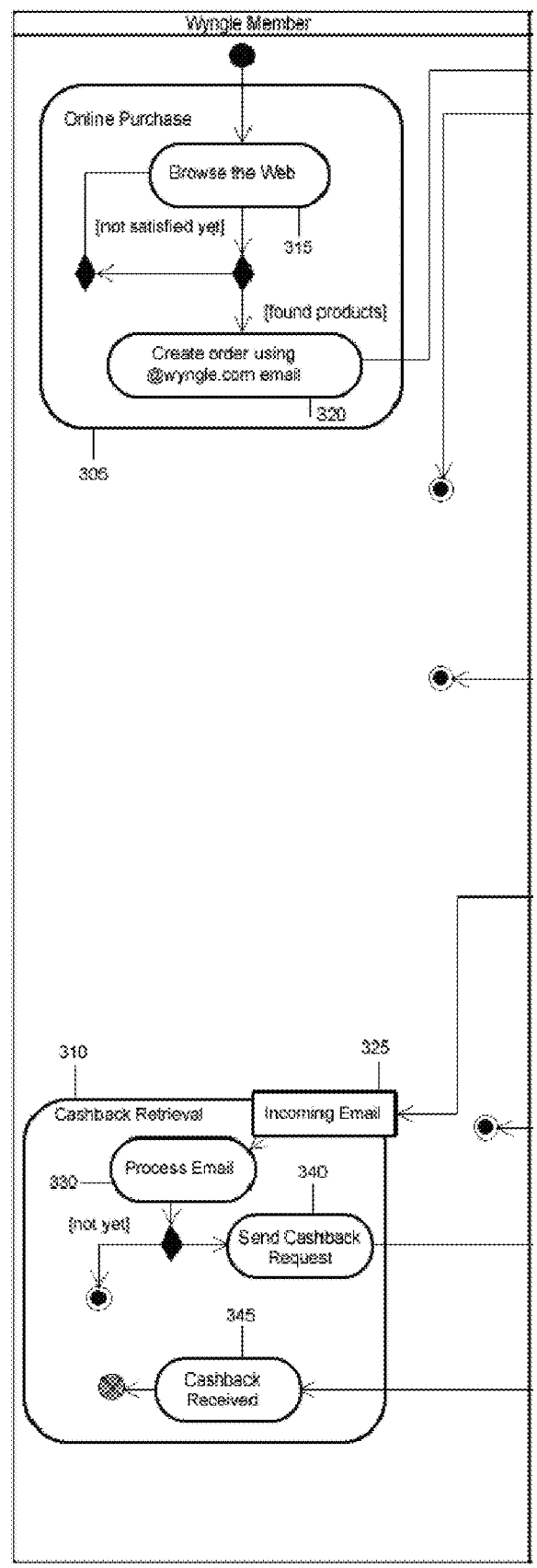
FIGS. 10A-10C illustrate the functional characteristics and operational flow of the Wyngle ecommerce solution.
Figure 10B:
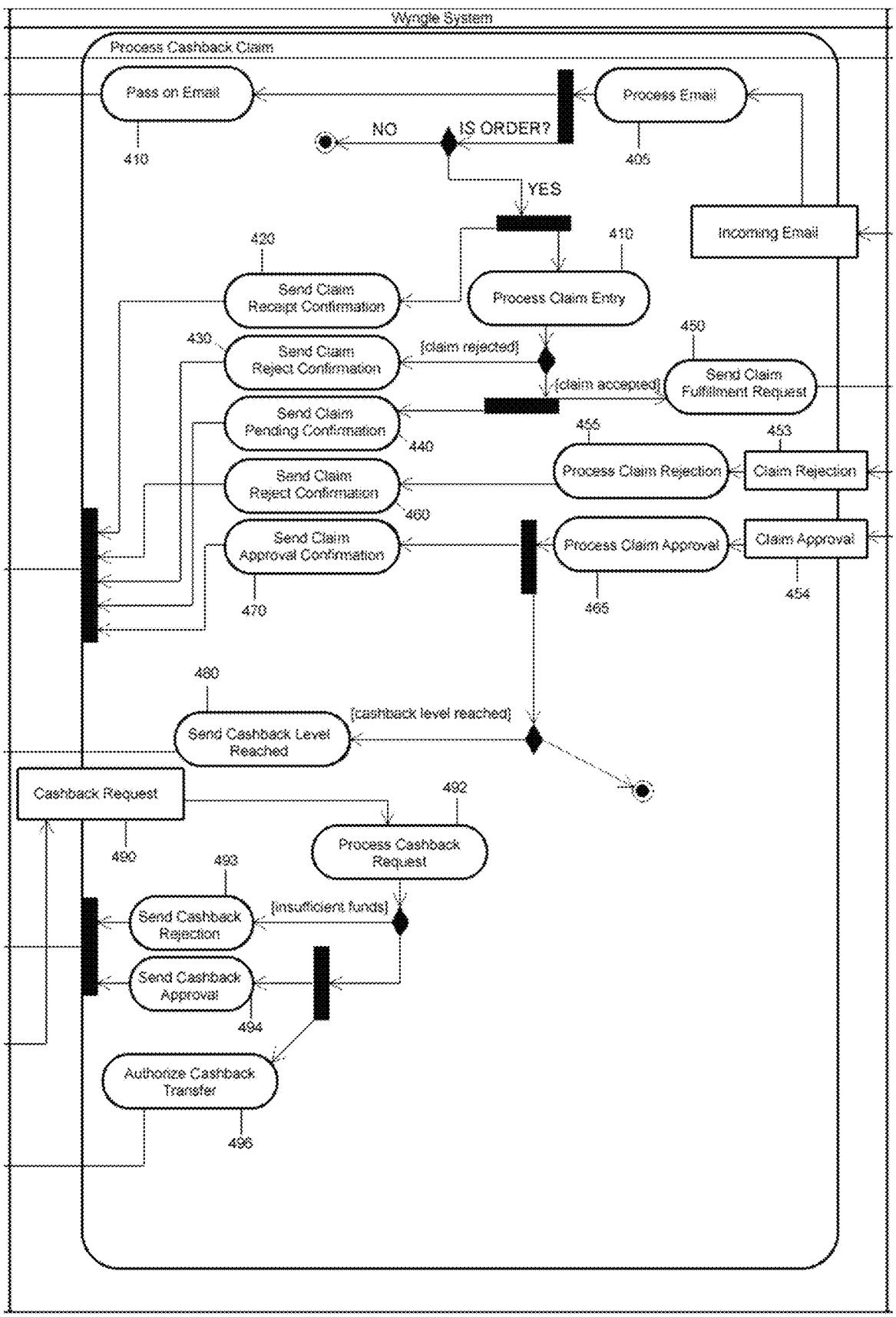
Figure 10C:
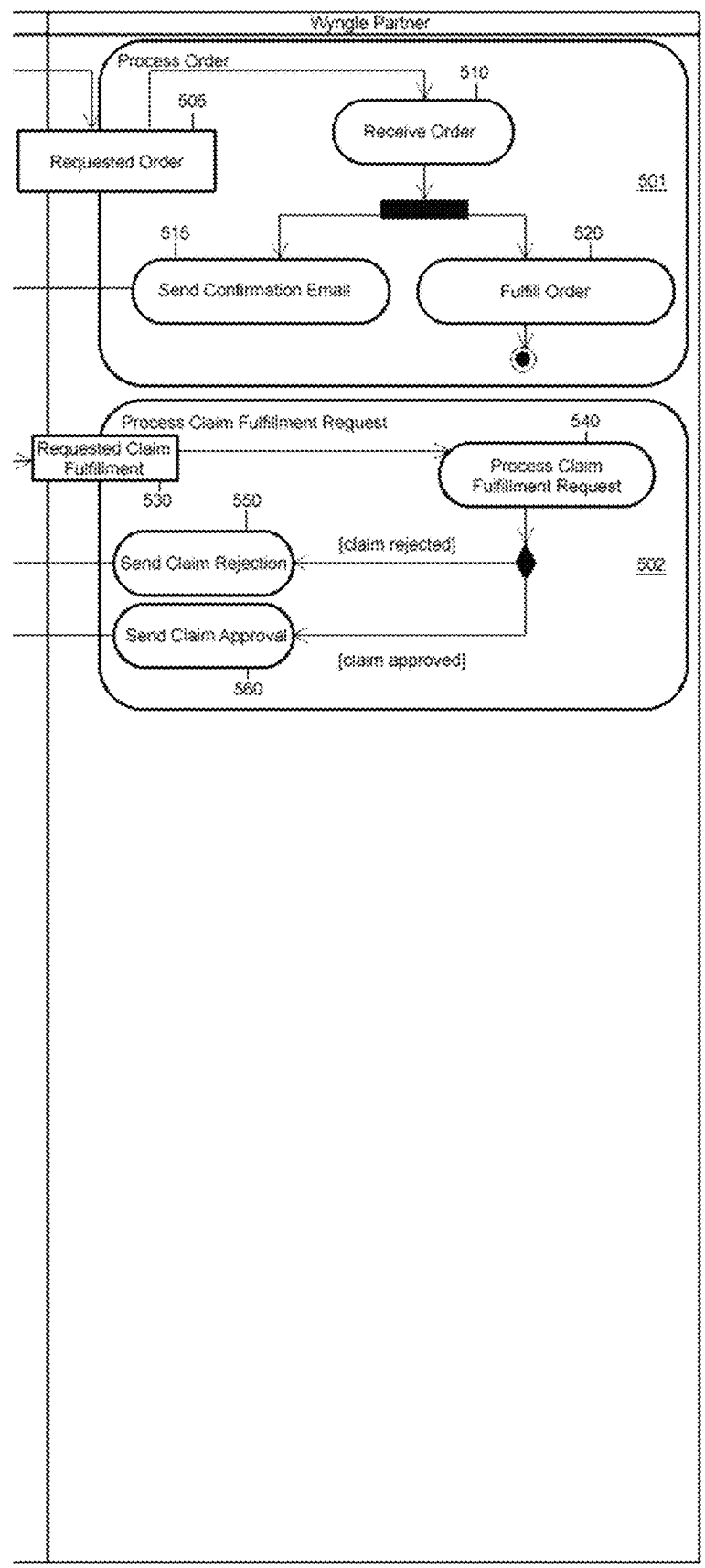

FIG. 10A shows events 300 associated with the Customer/Member side of the Wyngle model in response to events 400 and 500 associated with FIGS. 10B and 10C, respectively. FIG. 10B shows events 400 associated with the Wyngle System side in response to events 300 and 500 associated with FIGS. 10A and 10C, respectively. FIG. 10C shows events 500 associated with the Wyngle Partner side in response to events 300 and 400 associated with FIGS. 10A and 10B, respectively.

Referring to FIG. 10A, member events 300 are comprised of a first set of events 305 and a second set of events 310. Events 305 involve the actual online purchase and order process, while events 310 involve the cashback retrieval process.

The operational flow begins in step 315 with a registered Wyngle member searching the web for information about a product or service for which he/she desires to place an order. The search is repeated until the desired item and set of conditions (cashback incentive options, price point, etc.) have been satisfied. Once satisfied, the member places an order through a web-based user interface (step 320) substantially as was shown and described in connection with FIG. 5. The order is accompanied with the wyngle.com e-mail address of the member and sent for processing to the Wyngle Partner designated in the order for it to be processed and executed. The processing of orders is handled by event block 501. In step 505 of event block 501, the Wyngle Partner (and optionally the Wyngle system) recognizes that a communication has been sent and analyzes it to confirm it is a request for an order. Once so identified, the order is forwarded to the Wyngle Partner where it is received for processing by Wyngle Partner (step 510).

The Wyngle Partner in response thereto continues on to fulfill the order (step 520) and at the same time generates a confirmation e-mail, which is routed through the Wyngle System. The Wyngle System (step 405) scans and reviews the e-mail using automatic e-mail detection software. The e-mail is automatically passed on to the Wyngle member for which it was intended (step 410). At the same time, the e-mail scan results are analyzed to determine if the e-mail involves an order. If yes, then a corresponding claim entry is processed to determine whether or not to accept or reject the claim (steps 410).

A claim receipt confirmation is automatically sent by the Wyngle System (step 420) to apprise the Wyngle member that the system is aware than an order was placed and that it will be processing the claim in due course. In some instances, the claim rejection is automatic (step 430) and the Wyngle Member is so apprised.

In a typical scenario, processing of the claim by the Wyngle System involves (step 430) sending a claim fulfillment requirement request to the Wyngle Partner (step 530). The Wyngle Partner processes the request (step 540) and in turn generates an appropriate claim rejection (step 550) or claim approval (step 560) to the Wyngle System. At this time, a claim pending confirmation (step 440) may also follow from the Wyngle System to the Wyngle Member.

It should be appreciated that a claim may be rejected for any number of reasons, such as for example an item having been bought but returned or the failure of credit card approval to complete transaction.

When the Wyngle System receives a claim rejection from the Wyngle Partner (step 455), a claim reject confirmation is sent (sent 460) by the Wyngle System to the Wyngle Member to afford the Member an opportunity to challenge the rejection should he/she choose to do so.

When a claim approval is received instead (step 465), the Wyngle System sends a claim approval confirmation to the Wyngle Member (step 470).

In step 480, the Wyngle System makes an evaluation to determine if after the current claim entry approval, the Wyngle Member qualifies for a cashback, and if so, generates an e-mail to the member.

The Wyngle Member receives the e-mail (step 325), processes the e-mail (330), and determines whether to request a cashback (340). Any cashback request from the member is, in turn, processed (step 492) by the Wyngle System and either rejected (step 493), or approved (step 494). If approved, a cashback transfer is authorized (step 496), and the member sent a confirmation by which cashback receipt is finalized (step 345).

The above transaction process flow is intended to be merely exemplary. One skilled in the art could easily appreciate that other equivalent methodologies are possible without departing from the general scope of the invention as contemplated herein and as covered by the claims.

For example, in an exemplary embodiment, a Member may not be eligible to receive money after each transaction and must wait until a certain minimum level of cashback credits has been reached. This may be necessary to ensure administrative costs associated with cashback processing are manageable and economically feasible.

In yet another scenario, cashback credits may be used to apply toward purchases from either participating Partners, or from Wyngle's own marketplace.

As has already been explained, all process flow steps, while described as being initiated from within the Wyngle environment, most typically by Wyngle Members and Partners logging on to the Wyngle System and interacting with appropriate web-based user interfaces, it is possible and in some cases preferable for many of the actions involving communications from/to Members, Partners, and the System to occur entirely by e-mail, through a social media type environment, by SMS/MMS, or any other communication link capable of achieving the intended purpose stated herein.

Figure 11A:
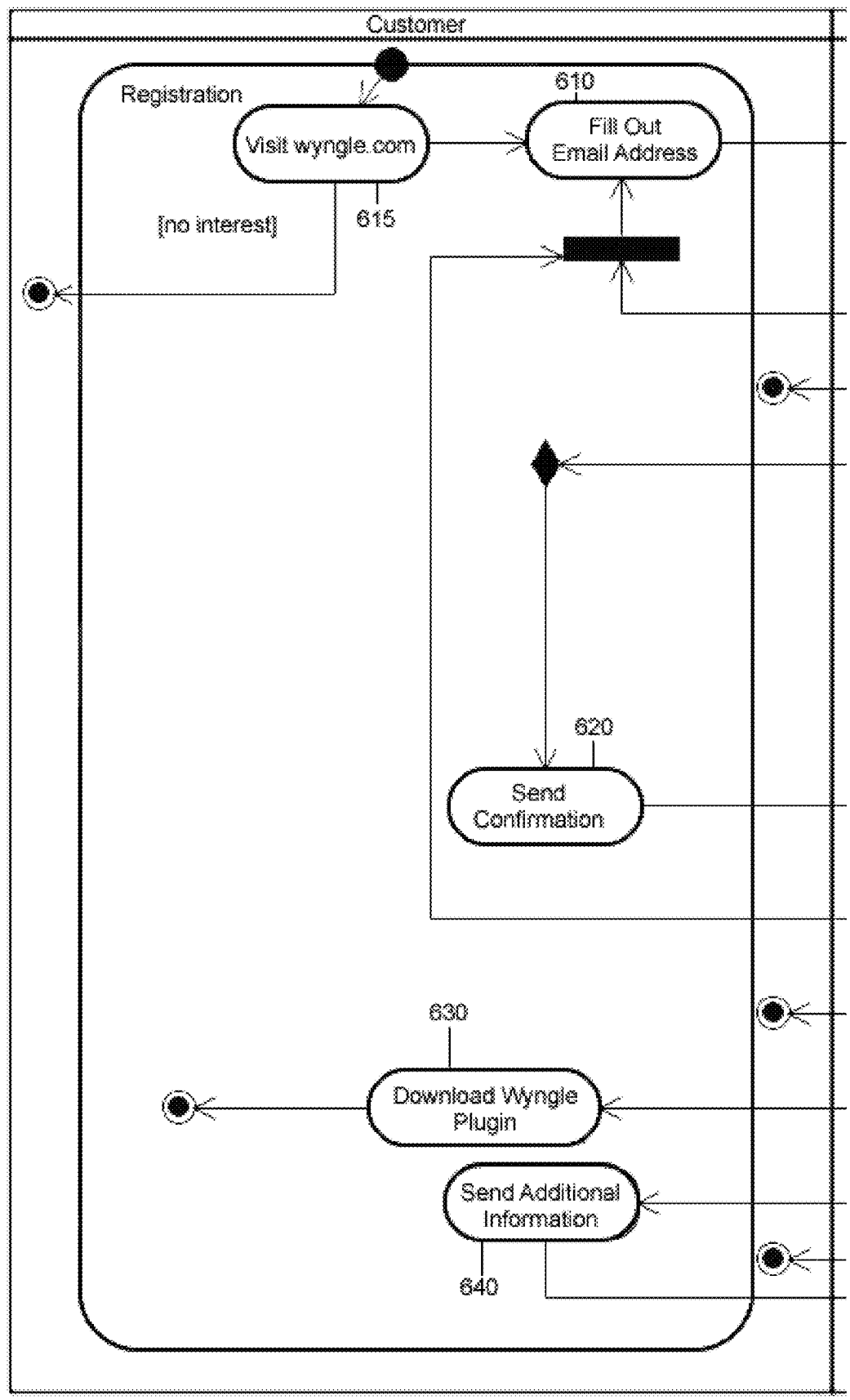
FIGS. 11A-B illustrate the new Member registration process.
Figure 11B:
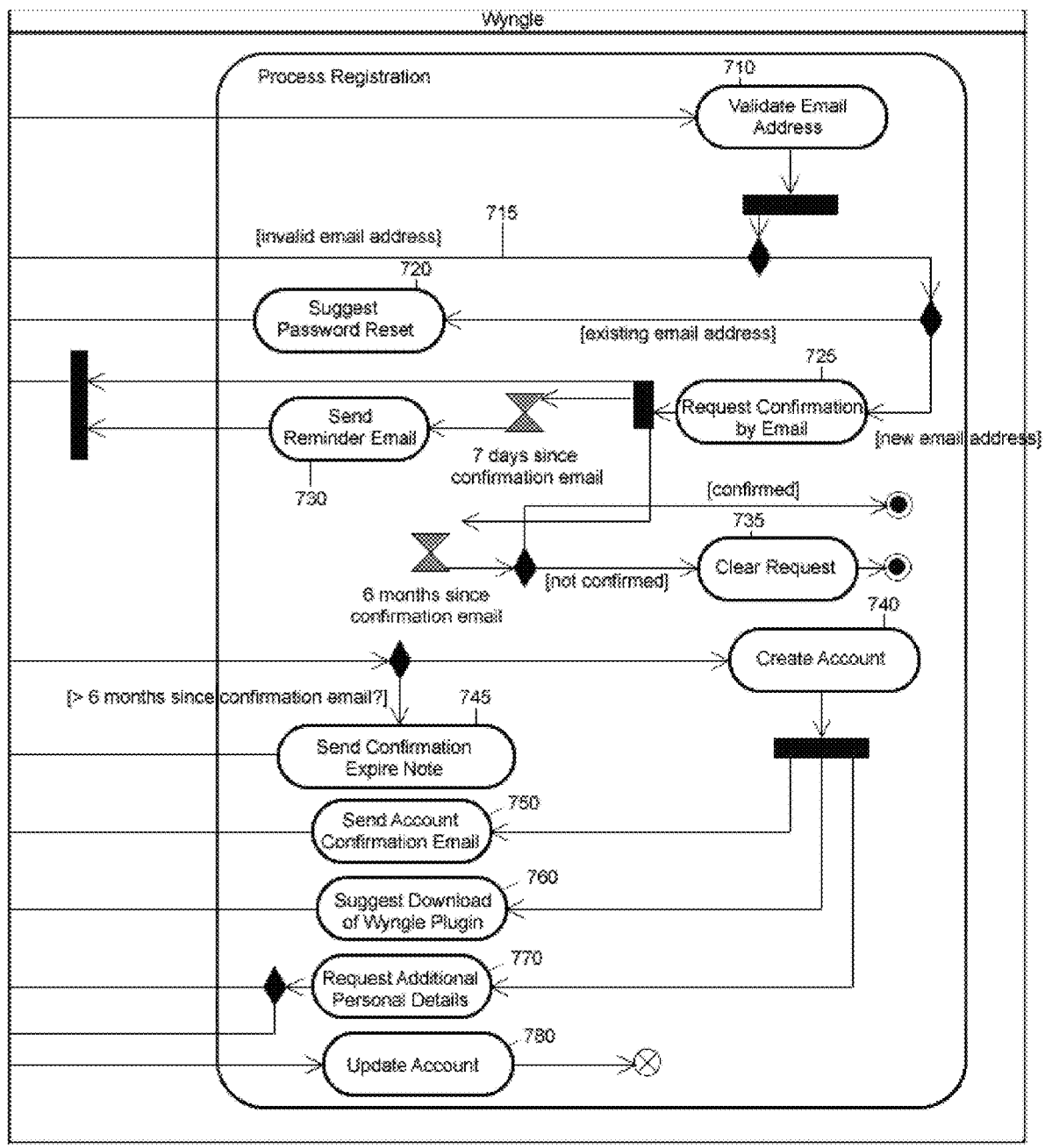

FIG. 11A shows events 600 associated with the Customer/Member side of the Wyngle model in response to events 700 associated with FIG. 11B. FIG. 11B shows events 700 associated with the Wyngle System side in response to events 600 associated with FIG. 11A.

The new Member registration process will now be described in greater detail with reference to FIGS. 11A-B.

At step 615, a new Member enters the wyngle.com site. At step 610, a UI is presented to the new Member where he/she is asked to select a @wyngle.com e-mail address. If the address is already assigned, the Member is asked to propose a different e-mail address (step 715). If valid, the System may request a password, or if a password has been provided for it to be reset if invalid (step 720).

At steps 725, 730, 620, and 735, the System and Member are each required to send each other confirmation requests and confirmation transmittals confirming that the principal contact e-mail—i.e., the existing e-mail address other than the @wyngle.com address—provided by the Member is real and valid. A time out period may be involved after which the new member sign up process terminates. Reminders may also be sent throughout this same period.

Once confirmation is received from Member, then account is set up (step 740) by Wyngle System. The System may automatically expire the account if it is inactive for a period of time. A simple confirmation by Member may reset the clock (step 745).

Once account is set up, the System sends an e-mail confirmation message to the new Member using the Member's newly assigned @wyngle.com e-mail address (step 750). As explained above, a Wyngle plug-in (such as a browser plug-in) may be available for use to Members. In steps 760, the System makes a recommendation to the new Member to download any available plug-in(s). Members interested in a better cashback experience may elect to download the available plug-in(s) (step 630).

Next, in order to be able to target promotional, marketing and other material to the Member, the System will request the Member to fill out or answer questions (step 770). The Member completes and sends back and the account updated (steps 640 and 780).

Figure 12:
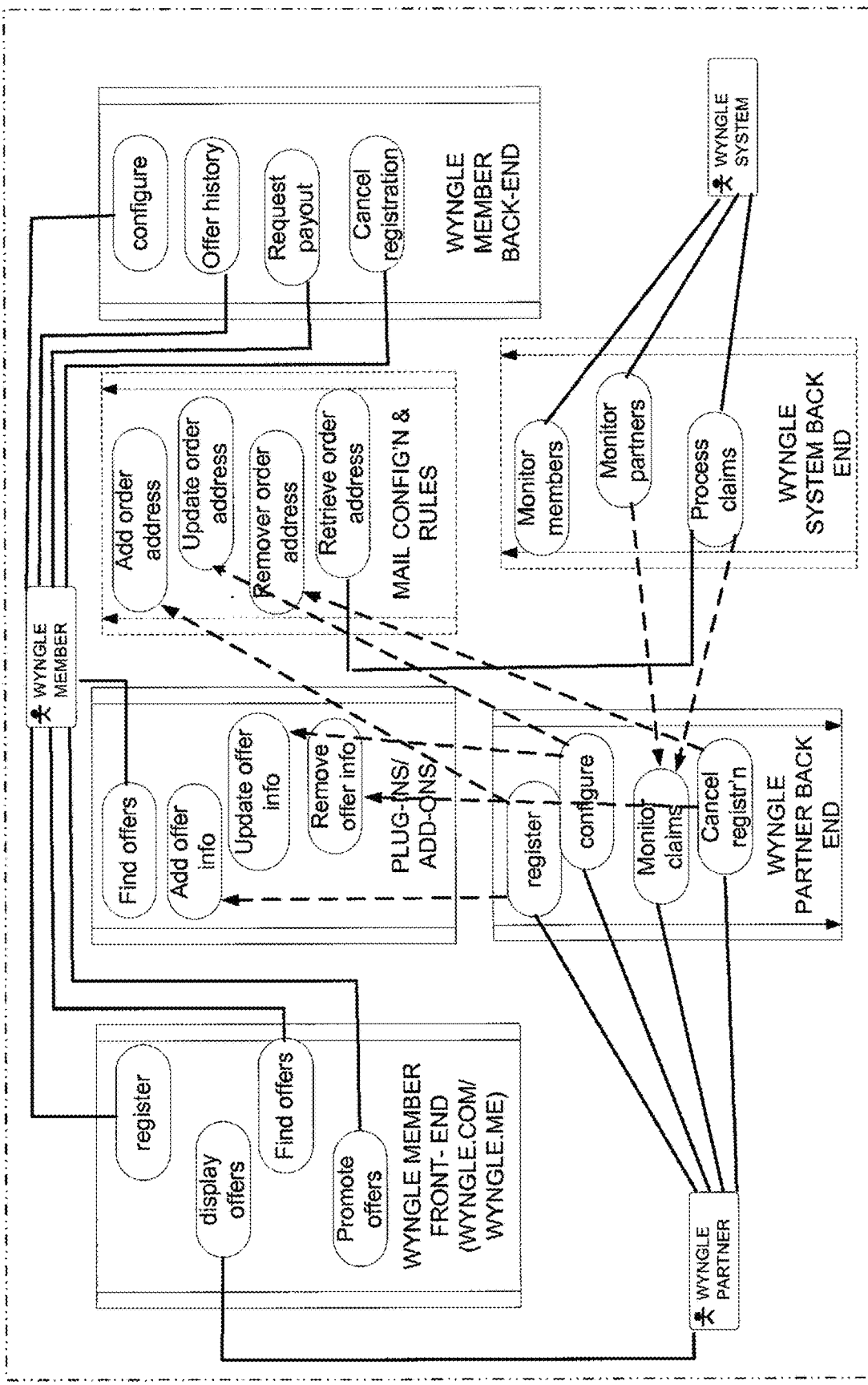
FIG. 12 is a high level block diagram of the interfunctional relationships among each Member, each Partner, and the System managing entity as a whole.

FIG. 12 is a high level block diagram of the inter-functional relationships among each Member, each Partner, and the System managing entity as a whole.

As can be readily seen from this high-level block diagram, each Member is functionally responsible for assisting the Wyngle System in maintaining services relating to (i) Wyngle Member Front-end operations: (ii) Wyngle Member Back-end operations; (iii) plug-in and add-on services; and (iv) the maintenance of various mail configuration and rule set up components and procedures.

Likewise, the Wyngle Partner is tasked in assisting with Wyngle Partner Back-end functionalities. The Wyngle System functions as a system administrator the primary functions of which are to monitor the activities performed by the Partners and Members and to process claims accordingly.

Figure 13:
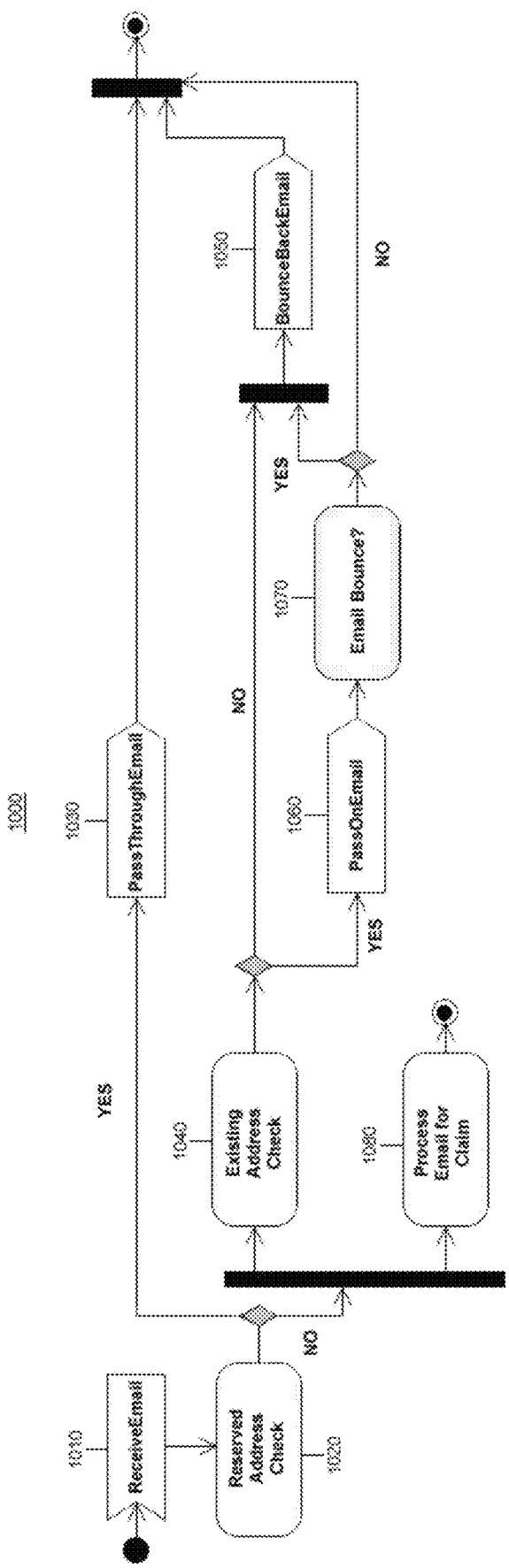
FIG. 13 illustrates the flow process by which the System processes e-mail communications having a System assigned address.

FIG. 13 illustrates the flow process by which the System processes e-mail communications having a System reserved address.

In step 1010, the Wyngle System receives an e-mail. This e-mail is checked to determine whether it is associated with a reserved e-mail address such as webmaster@wyngle.com or support@wyngle.com (step 1020). In case it is a reserved e-mail address it does not pass through the system but goes directly to the intended recipient (step 1030). Regardless of being an existing Member address the incoming e-mail will be processed to determine if it is an order (step 1080). An existing address check is performed checking whether there is a Wyngle username associated with the e-mail address of the incoming e-mail (step 1040). If this is the case the incoming Wyngle e-mail is passed on to the e-mail address on file for this Member (step 1060), else a bounce e-mail message is sent back to the sender of the Wyngle e-mail (step 1050). If it turns out that the e-mail address Wyngle has on file for the Member is not existing anymore or has any other delivery problem (such as account quota exceeded) Wyngle will receive back the bounce on that e-mail address and will appropriately pass it back to the sender of the Wyngle e-mail (steps 1070-1050).

The process in steps 1040-1070 are aimed at ensuring that an always current non-Wyngle e-mail address is on file for each of its Members. When a change is noted, the process described serves as a mechanism for correcting outdated e-mail information. It also affords the System an opportunity to seek other Member personal information such as new work and business addresses, updated credit card information, and the like.

In the end, Partners have a higher level of certainty than with conventional ecommerce platforms that Member information is up-to-date and accurate.

Wyngle.Me Option

In an alternate scenario, a 'Wyngle.Me' option is made available to Wyngle Members. With Wyngle.Me, Wyngle Partners are afforded an opportunity to select a single item and arrange for a special offer to be extended to the Wyngle Member community at large. In one scenario of Wyngle.Me, the offer is a static or increasing cashback percentage depending on the amount of products sold. For example, a partner has 1000 products and wants to sell them. The partner offers them against a (for example) 10% commission to Wyngle, as a special offer on Wyngle.Me, which corresponds to 5% discount cashback to a member. The partner may also select the increasing cashback percentage option, as follows:

if within the set period 50 products are 'wyngled' then the commission is actually 6% (3% for the members)
if within the set period 200 products are 'wyngled' then the commission is actually 10% (5% for the members)
if within the set period 500 products are "wyngled" the commission is actually 12% (6% for the members)
if within the set period all 1000 products are 'wyngled' then 16% commission is given (8% for the members)

The benefit here over existing solutions (e.g. Groupon's approach) is that in the present solution the partner will sell at least some products and the interested customers will be able to buy those products at least with some discount. Groupon differs in that if prescribed amount of purchasers is not reached, then no sale at all is made to anyone.

The Wyngle.Me approach described operates on the principle that a customer (i.e., a member of wyngle.com) wants to buy a certain product anyway, and he/she already has a base discount to start with. If he/she manages through the shopping community aspect of Wyngle or other social network connections to promote this offer and spread the word to others, then more people will join the Wyngle community and buy a product within a set action period. In this way, customers benefit from the additional discount and the partner (vendor) benefits from large volume sales, while at the same time gains a 'life line' with a wide range of customers at once, via their wyngle.com e-mail address.

The Wyngle. Me solution is particularly interesting for high commission items and higher priced items where the combination of commission percentages on higher prices for a large number of sales, grows significantly quickly into large numbers.

The Wyngle Partner

While not much has been said about the Wyngle Partner, this is ultimately any single or multi-person business enterprise. Like Members, Partners are also provided with a username and password to allow them access to the System. The System provides a user-friendly Partner interface and clear overview of outstanding cash back claims to be validated, as well as information about revenue generated via the Wyngle network in the past, possibilities to adjust the commission level, invoices paid and to be paid) and other useful features. It should be appreciated that any number of useful services and offers can be added to the marketing mix to allow partners to build a steady relationship with the Wyngle community and as a result grow their online revenues.

Browser Add-on

As has already been explained, one of the ways to better bring together Wyngle partners and Wyngle members is by providing a browser add-on to members that is resident on the latter's computing station. With a browser add-on, members are better able to recognize which company is part of the Wyngle partner network and get information about the cash back offers for these companies. This kind of enhanced functionality is expected to provide a direct incentive to purchase from partner businesses, which in turn serves as a motivating factor for more partners to become part of the Wyngle community. Browser add-on provides direct visual differentiation on any browser's search results or page visited and could help reduce cost for other less revenue generating add-campaigns.

In yet a further exemplary embodiment, the System collects meta-data with the orders received and processed, including information on who a product was bought for and why it was bought. This information makes it possible for the System to be able to send targeted advertising to its Members as a whole for certain upcoming occasions or other specific scope events.

For example, the System may be more inclined to promote a certain book at a particular time of the year when it is more likely to be bought (such as on Father's Day) rather than on other periods of the year where sales of the same book are negligible and targeted advertising space could be better utilized.

The additional information could be used to enhance the profile of members, and members afforded an opportunity to change the enhanced profile parameters to better suit their specific needs.

It is further contemplated that Wyngle can serve as a hub for Members to post reviews and comments about products, regardless whether they were bought from a Wyngle Partner's site, or indirectly via the Wyngle System.

Wyngle.US Option

In yet a further alternate scenario, a 'Wyngle. US' option is made available to Wyngle Members. In this scenario, a Wyngle. US website is made available to Wyngle community members. The idea here is to allow a member to engage Wyngle Partners directly with respect to a particular product or service. With respect to such item, a member is permitted to negotiate a deal with a partner, such as for a better cash back offer, with the catch being that the member commits to try and generate sales for the partner.

To join in an offer, participating members pay the real product price to the Wyngle account where it is blocked for further use. Once the time runs out for the deal, the participants will receive a coupon code which they will use on the website of the partner when they purchase the actual product. By entering the coupon code they will not pay for the product on the partners' website. Wyngle receives an order confirmation but deducts from the product price any promised cash back incentive, in effect reducing the net purchase price for the member (after taking into account the commission owed to the Wyngle System, as facilitator of all transactions between members and partners).

Wyngle.IT Option

In yet a further scenario (hereafter the "Wyngle.IT" scenario), Wyngle members are provided with appropriate UI tools to be able to sell products to one another, as well as partners to other partners. The selling party sets the cash back percentage, and once the product is bought, then the standard cash back rules apply for that selling party.

Businesses will likely be required to separately register for such a service, required to pay a registration fee for a premium account, and perhaps or not an amount for each product uploaded.

Various embodiments of the invention are described above in the Detailed Description. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s).

The foregoing description of a preferred embodiment and best mode of the invention known to the applicant at this time of filing the application has been presented and is intended for the purposes of illustration and description. It is not intended to be exhaustive or limit the invention to the precise form disclosed and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated. Therefore, it is intended that the invention not be limited to the particular embodiments disclosed for carrying out this invention, but that the invention will include all embodiments falling within the scope of the appended claims. In another similar scenario, the agent is a social network community platform such as Facebook, MySpace, or smaller communities, such as corporate communities of employees, common interest groups, and similar platforms.

In one or more exemplary embodiments, the functions described may be implemented in hardware, software, firmware, or any combination thereof. If implemented in software, the functions may be stored on or transmitted over as one or more instructions or code on a computer readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer apparatus comprising at least one processor and a memory configured with instructions that, when executed by the at least one processor, implement an e-commerce platform, the e-commerce platform comprising:
   a member front-end module configured for managing member accounts and data, for accepting orders, and for promoting offers;
   a member back-end module configured for offering history of transactions, requesting payout, and cancelling member accounts;
   a partner back-end module configured for registering and configuring offers, monitoring process claims, and cancelling accounts;
   a system back-end module configured for monitoring members and partners;
   a plug-in and add-on services module configured for finding, updating and removing offers; and
   a mail configuration and rule set up components and procedures module configured for managing order addresses;
   wherein the modules are further configured to communicate with each other, with at least one member computing apparatus as a second computer apparatus, and with at least one partner computing apparatus as a third computer apparatus by email messages using email addresses local to the e-commerce platform,
   wherein the email addresses are used as unique identifiers each associated inside the e-commerce platform with the at least one member, such that any information associating the email addresses, and the email messages with the at least one member are not accessible from outside of the e-commerce platform, and
   wherein the e-commerce platform analyses email messages for processing orders and rewards.

2. The computer apparatus of claim 1, wherein the rewards are cashback incentives.

3. The computer apparatus of claim 2, wherein the e-commerce platform initiates the cashback incentives in response to the at least one member having reached a certain level amount in cashbacks.

4. The computer apparatus of claim 1, wherein the plug-in and add-on services module is configured to allow the at least one member to perform an online product search used to place a request for an order.

5. The computer apparatus of claim 1, wherein the plug-in and add-on services module comprise a browser plug-in that operates to provide the at least one member with up-to-date promotions and targeted advertising.

6. The computer apparatus of claim 1, wherein the e-commerce platform assigns to the at least one member an e-mail address that is associated with an existing e-mail address of the at least one member at the time of creation of the corresponding member account, and wherein the e-commerce platform verifies the existing e-mail address by transmitting and receiving confirmation messages prior to finalizing creation of the corresponding member account.

7. The computer apparatus of claim 1, wherein one of the modules of the e-commerce platform is configured to intercept e-mail communications between the at least one member and the at least one partner to identify those communications that are actual order confirmations from the at least one partner to the at least one member.

8. The computer apparatus of claim 1, wherein one of the modules of the e-commerce platform is configured to scan communications to/from the at least one member and the at least one partner to determine when a communication involves a request for an order, and based on the scanning, determines when the at least one member is entitled to a reward.

9. A computer-implemented method for operating an e-commerce platform at a first computing apparatus, the method comprising:
   managing member accounts and data, accepting orders, and promoting offers by a member front-end module;
   providing history of transactions, requesting payout, and cancelling member accounts by a member back-end module;
   registering and configuring offers, monitoring process claims, and cancelling accounts by a partner back-end module;

monitoring members and partners by a system back-end module;

finding, updating, and removing offers by a plug-in and add-on services module; and managing order addresses by a mail configuration and rule set up components and procedures module;

wherein the modules are further configured to communicate with each other, with at least one member computing apparatus as a second computing apparatus, and with at least one partner computing apparatus as a third computing apparatus by email messages using email addresses local to the e-commerce platform;

wherein the email addresses are used as unique identifiers each associated inside the e-commerce platform with the at least one member, such that any information associating the email addresses, and the email messages with the at least one member are not accessible from outside of the e-commerce platform; and wherein the method further comprises analyzing email messages for processing orders and rewards.

10. The method of claim 9, wherein the rewards comprise cashback incentives.

11. The method of claim 10, further comprising initiating the cashback incentives in response to the at least one member having reached a certain level amount in cashbacks.

12. The method of claim 9, wherein the plug-in and add-on services module allows the at least one member to perform an online product search used to place a request for an order.

13. The method of claim 12, wherein the plug-in and add-on services module comprises a browser plug-in that provides the at least one member with up-to-date promotions and targeted advertising.

14. The method of claim 9, wherein an email address of the at least one member is an assigned email address associated with an existing email address of the at least one member at the time of creation of the corresponding member account with the e-commerce platform.

15. The method of claim 9, further comprising intercepting email communications between the at least one member and the at least one partner to identify those communications that are actual order confirmations from the at least one partner to the at least one member.

16. The method of claim 9, further comprising scanning communications to and from the at least one member and the at least one partner to determine when a communication involves a request for an order, and, based on the scanning, determining when the at least one member is entitled to a reward.

17. A non-transitory computer-readable medium configured with instructions that, when executed by at least one processor of a first computing apparatus, cause the computing apparatus to perform a method for operating an e-commerce platform, the method comprising:

managing member accounts and data, accepting orders, and promoting offers by a member front-end module;

providing history of transactions, requesting payout, and cancelling member accounts by a member back-end module;

registering and configuring offers, monitoring process claims, and cancelling accounts by a partner back-end module;

monitoring members and partners by a system back-end module;

finding, updating, and removing offers by a plug-in and add-on services module; and managing order addresses by a mail configuration and rule set up components and procedures module;

wherein the modules are further configured to communicate with each other, with at least one member computing apparatus as a second computing apparatus, and with at least one partner computing apparatus as a third computing apparatus by email messages using email addresses local to the e-commerce platform;

wherein the email addresses are used as unique identifiers each associated inside the e-commerce platform with the at least one member, such that any information associating the email addresses, and the email messages with the at least one member are not accessible from outside of the e-commerce platform; and wherein the method further comprises analyzing email messages for processing orders and rewards.

18. The non-transitory computer-readable medium of claim 17, wherein the method further comprises scanning communications to and from the at least one member and the at least one partner to determine when a communication involves a request for an order, and, based on the scanning, determining when the at least one member is entitled to a reward.

19. The non-transitory computer-readable medium of claim 17, wherein the method further comprises intercepting email communications between the at least one member and the at least one partner to identify those communications that are actual order confirmations from the at least one partner to the at least one member.

20. The non-transitory computer-readable medium of claim 17, wherein the method further comprises allowing the at least one member to place a request for an order with an online marketplace and generating order confirmations to an inbox order folder associated with the user ID.

* * * * *